US005737520A

United States Patent [19]

[11] Patent Number: 5,737,520
[45] Date of Patent: Apr. 7, 1998

Gronlund et al.

[54] METHOD AND APPARATUS FOR CORRELATING LOGIC ANALYZER STATE CAPTURE DATA WITH ASSOCIATED APPLICATION DATA STRUCTURES

[75] Inventors: Robert D. Gronlund; Brian A. Willette, both of Colorado Springs, Colo.; William M. Zevin, Raleigh, N.C.

[73] Assignee: Hewlett-Packard Co., Palo Alto, Calif.

[21] Appl. No.: 708,142

[22] Filed: Sep. 3, 1996

[51] Int. Cl.[6] .................... G06F 11/22

[52] U.S. Cl. .................... 395/183.15; 395/183.18; 395/185.1

[58] Field of Search .................... 395/183.18, 183.15, 395/185.1, 183.13; 371/2.2; 364/927.3

[56] References Cited

U.S. PATENT DOCUMENTS

| | | | |
|---|---|---|---|
| 3,826,908 | 7/1974 | Weathers et al. | 395/183.15 |
| 4,517,671 | 5/1985 | Lewis | 371/19 |
| 4,641,348 | 2/1987 | Neuder et al. | 382/1 |
| 4,696,004 | 9/1987 | Nakajima et al. | 395/183.15 |
| 4,965,765 | 10/1990 | Brown | 364/900 |
| 5,282,213 | 1/1994 | Leigh et al. | 395/183.15 |
| 5,428,766 | 6/1995 | Seaman | 395/183.15 |
| 5,613,063 | 3/1997 | Eustace et al. | 395/183.14 |

*Primary Examiner*—Robert W. Beausoliel, Jr.
*Assistant Examiner*—Scott T. Baderman

[57] ABSTRACT

Methods and associated apparatus for analyzing and presenting captured state logic data including memory accesses by an intelligent I/O interface device and an attached computer system. The data analysis and display of the present invention aids an engineer in locating data corruption failures in a system. The heuristic analysis of the methods of the present invention locate and identify buffers accessed within the captured state logic data and buffer descriptors accessed within the captured state logic data despite the time dispersion thereof. The buffers and buffer descriptors located and identified within the captured state logic data are displayed on a computer display screen in a manner to more effectively assist an engineer in locating a root cause of data corruption than was possible with prior methods devoid of the analysis of the present invention. In particular, the display visually identifies buffers regardless of the state/time dispersion in the original captured state logic data and distinguishes read access from write access thereto. The display includes indicia used to associate a located and identified buffer descriptor with the identified buffer to which it refers. In response to user requests, the data contained in a selected buffer or selected buffers may be textually displayed either in a raw form or in accordance with the protocol specifications of the underlying data exchange application being debugged. The identified buffers may also be easily searched for a user specified string without concern for the time dispersion of the buffers in the captured state logic data.

31 Claims, 15 Drawing Sheets

METHOD AND APPARATUS FOR CORRELATING LOGIC ANALYZER STATE CAPTURE DATA WITH ASSOCIATED APPLICATION DATA STRUCTURES

BACKGROUND OF THE INVENTION

1. Field of the Invention

The present invention relates to the use of logic analyzer state capture information to problem identification and resolution and more particularly, the present invention relates to methods and apparatus for analyzing and presenting logic analyzer state capture information in a manner which aids in correlating the state capture information with higher level data structures used in generating the logic states.

2. Description of Related Art

Intermittent data corruption is a common class of problems in the design and debug of electronic/software systems. Often the data corruption is a symptom or manifestation of a deeper root cause. Such problems can be very difficult to locate because the root cause of a particular data corruption symptom may occur significantly earlier in the operation of the system as compared to the detection of the data corruption. The root causes of such intermittent failures often relates to software defects (such as improper pointer dereferencing), electronic hardware design defects (such as ground bounce), improper design assumptions regarding the hardware or software, or combinations of these problems.

Current engineering design tools for debug of such intermittent failures include: protocol analyzers, logic analyzers, microprocessor emulators, bit error rate testers, and oscilloscopes. Each of these tools provides the engineer a view as to the proper, or improper, operation of one aspect of a potentially complex system. Protocol analyzers aid in identifying the propriety of data as transmitted across a communication medium. Logic analyzers and oscilloscopes provide detailed information regarding the digital and analog signal parameters of the electronics in the system. Microprocessor emulators permit detailed analysis of the operation of software within the system. These tools are often used in various combinations by design engineers to analyze and debug several aspects of the system when a failure occurs.

In general, engineers seek to identify and resolve intermittent failures using a "divide and conquer" approach to narrow the search for the root cause of a particular failure. Engineering analysis seeks to eliminate possible causes by viewing the inputs provided to a particular component/aspect of the system and verifying that it produces the expected outputs. If the input at a particular level is erroneous, the engineer then shift analysis further "upstream" to the source of that input and so on until the root cause is located and repaired.

A problem with current analysis tools and methodologies for their use lies in the fact that though many of the tools integrate various test functions, they do not possess the ability to correlate the low level (hardware state level) capture of state data with the higher level semantic meaning of the states as manipulations of data structures. Such correlation of the low level state capture information with the high level data structures being manipulated is left to the mind of the design/test engineer. Without such correlation to the semantic manipulation of associated data structures, the individual state captures of each analyzer cannot be synergistically combined to provide additional debugging information.

For example, in a computer communication network system, it is common for an intelligent network interface card (NIC) used within a processor complex (host computer) to include significant processing power on the network interface card itself. The NIC and host computer then exchange data, commands, and status via shared access through a common bus to buffers, buffer descriptors, and status areas stored in the host computer's main memory. The host computer system directs the intelligent NIC to process a queue of commands contained in a series of buffer descriptors in the computer's main memory. The NIC fetches the descriptor blocks from the main memory and processes the particular commands contained therein including the exchange of data between the NIC and buffers in the main memory (as directed by the commands in the buffer descriptor). An engineer may debug a network protocol system problem in such an environment through the combined use of a network protocol analyzer (e.g., to monitor data exchanged over the network medium), a microprocessor emulator (e.g., to monitor and/or control the operation of programmed instructions on a main processor or on the NIC processor as network data is generated and transferred), and a logic analyzer (e.g., to monitor hardware state information on a bus connecting the NIC to the main processor). When the particular protocol error is first sensed (such as by a triggered condition on the protocol analyzer or test software), the logic analyzer and microprocessor emulator may be triggered to capture their respective data for a period of time preceding the detected protocol error. The engineer must then manually attempt to correlate the network data exchanged on the network medium as captured in the protocol analyzer with the software state captured in the microprocessor emulator and with the network interface card state captured in the logic analyzer. Although the various analyzers and emulators may be correlated or synchronized with respect to time, the captured data cannot be easily correlated with the higher level data structures (and their contents) used by the main processor or by the intelligent network interface card. Rather, the engineer is faced with a tedious, time-consuming task of manually interpreting the captured state information from all analyzers to establish the desired correlation.

The interface between such intelligent I/O interface devices and their attached host computers is therefore a critical aspect of the analysis needed to isolate the root cause of a data corruption problem. A common cause for data corruption failure arises from this I/O architecture when, due typically to software or hardware timing errors, one computer begins overwriting a buffer or descriptor block before the previous actions using those descriptors of buffers has completed. Or in other situations, the descriptors or buffers are simply written with information beyond their defined capacity or size such that other descriptors of buffers are erroneously changed while still in use.

Modern test and analysis devices, such as logic analyzers, have evolved by adding larger memories for deeper storage of captured information. Such deep capture memories are generally helpful for locating and identifying problems in that the increased depth increases the probability that data relevant to the problem to be resolved will be contained in the captured memory. However, the larger volume of captured data also multiplies the engineer's problem of manually correlating captured data with the higher level data structures being manipulated. Continued growth in capture memory depth will continue to worsen the engineer's problems in manually correlating the captured state data with the higher level activities including data structure manipulations.

It is clear from the above discussion that a need exists for enhancing the automation and support for the engineer's task of correlating low level state capture information with the corresponding higher level activities at the root of the problem being debugged.

SUMMARY OF THE INVENTION

The present invention solves the above and other problems, thereby advancing the state of the useful arts, by providing automated methods and associated apparatus for aiding the test/design engineer in correlating low level state capture information with higher level data structures being manipulated by the system under test. In particular, methods of the present invention are operable upon state capture information gathered by a logic analyzer connected in such a way as to monitor the information exchanged between intelligent I/O interface devices and an attached, controlling, main processor. As used herein, the main processor refers to a computer attached via an I/O interface bus to an intelligent I/O interface device. In such a configuration, the main processor and intelligent I/O interface device share access to a memory subsystem attached to the main processor and the I/O interface device (via the I/O interface bus). This I/O architecture is common in general purpose computing systems such as personal computers and workstations. Such I/O architectures are also common in many special purpose devices such as test and analysis equipment in which an embedded main processor controls the operation of the device while attached intelligent I/O interface devices perform specific operations for the special purpose equipment. The methods of the present invention are therefore applicable both to general purpose computing systems as well as special purpose test or communications devices having the above described I/O architecture embedded within.

In general the representation of the particular data exchange protocol in use is observable by monitoring the main memory accesses by the main processor and the attached I/O interface. Packetized protocols are exemplary of data exchange protocols for which the methods and apparatus of the present invention may be advantageously applied. In particular, the units of data exchanged in such protocols are referred to as packets, frames, or simply protocol data units. Packets in such protocols usually are usually located in a shared memory accessible by both a host computer and an associated intelligent I/O device. The packets are usually separated in the memory by overhead data structures associated with the management of the shared memory. The overhead portions of the data structures associated with the packets in memory are often referred to as sentinels. Well known memory management techniques (such as "malloc" and related UNIX system functions) use such sentinel structures to manage the use of the shared memory structures. Additionally, the methods of the present invention are also able to analyze buffers located in "contiguous" or "locked down" (usually statically pre-allocated) buffer pools.

The memory accesses captured in the state capture information are analyzed by the methods and apparatus of the present invention to reconstruct the manipulation of buffers in the exchange of data between the main processor (host computer) and attached I/O devices. The methods of the present invention therefore analyze the captured state information to present the captured state information in a manner which is correlated to the underlying data structure manipulations between the host computer and I/O interface and also correlated to the underlying data exchange protocol being debugged.

More specifically, the methods of the present invention automatically analyze the captured state information to heuristically locate and identify buffers and buffer descriptors being exchanged between the host computer and the attached I/O interface card. Configuration parameters of the methods and apparatus of the present invention define the rules used to heuristically identify buffers and buffer descriptors in the captured state information. The configuration parameters permit the methods and apparatus of the present invention to adapt easily to a particular data exchange protocol or data structure.

Identifying and locating buffers and buffer descriptors within the captured state information aids the engineer in correlating the captured state data in a logic analyzer with the corrupted data exchange associated with the problem to be resolved. Further methods of the present invention correlate particular buffer descriptors with the particular buffer to which it refers. Still further methods of the present invention correlate the identified buffers and buffer descriptors with the particular data exchange protocol in use for the application. This correlation further aids the engineer in narrowing the field of search for the root cause of the problem being analyzed.

Methods of the present invention display the state capture information on a computer display screen in graphical and textual styles which clarify the correlation between the state capture information and the higher level data structures and protocols of the main processor. In particular, buffers are identified by visually connecting the plurality of captured states which represent memory references to an identified buffer. The color of the buffer on the display screen indicates whether the buffer access is for a read or write operation. Each buffer descriptor identified by the analysis heuristics is graphically connected to the associated buffer by a graphical vector. A user of the methods of the present invention may graphically select a particular identified buffer or buffer descriptor and view the data content thereof in a separate text window on the display screen. The contents of the selected buffer or descriptor may be viewed in a raw hexidecimal mode or a textual translation mode such as ASCII or EBCDIC.

The methods of the present invention are operable on a general purpose computer. Such a computer may be either embedded within a logic analyzer or external to a logic analyzer operating in a post processing mode to analyze and display buffer and protocol information in the captured states retrieved from a logic analyzer. In the alternative, portions of the present invention may be embedded within custom hardware assist electronic circuits to enhance the performance of the analysis and recognition methods of the present invention. Such custom assist circuits may be integrated within the user interface control circuits and software of a logic analyzer.

In addition, one of ordinary skill in the art will recognize features of the present invention which aid the user in determining detailed aspects of system performance when used to inspect localized conditions of operation. The visualization features provided by the methods and apparatus of the present invention make apparent many detailed features of performance including, but not limited to, bus ownership, burst efficiency, and data transfer rates.

DETAILED DESCRIPTION OF THE PREFERRED EMBODIMENTS

Local Analyzer/Computing Environment

Figure 1:
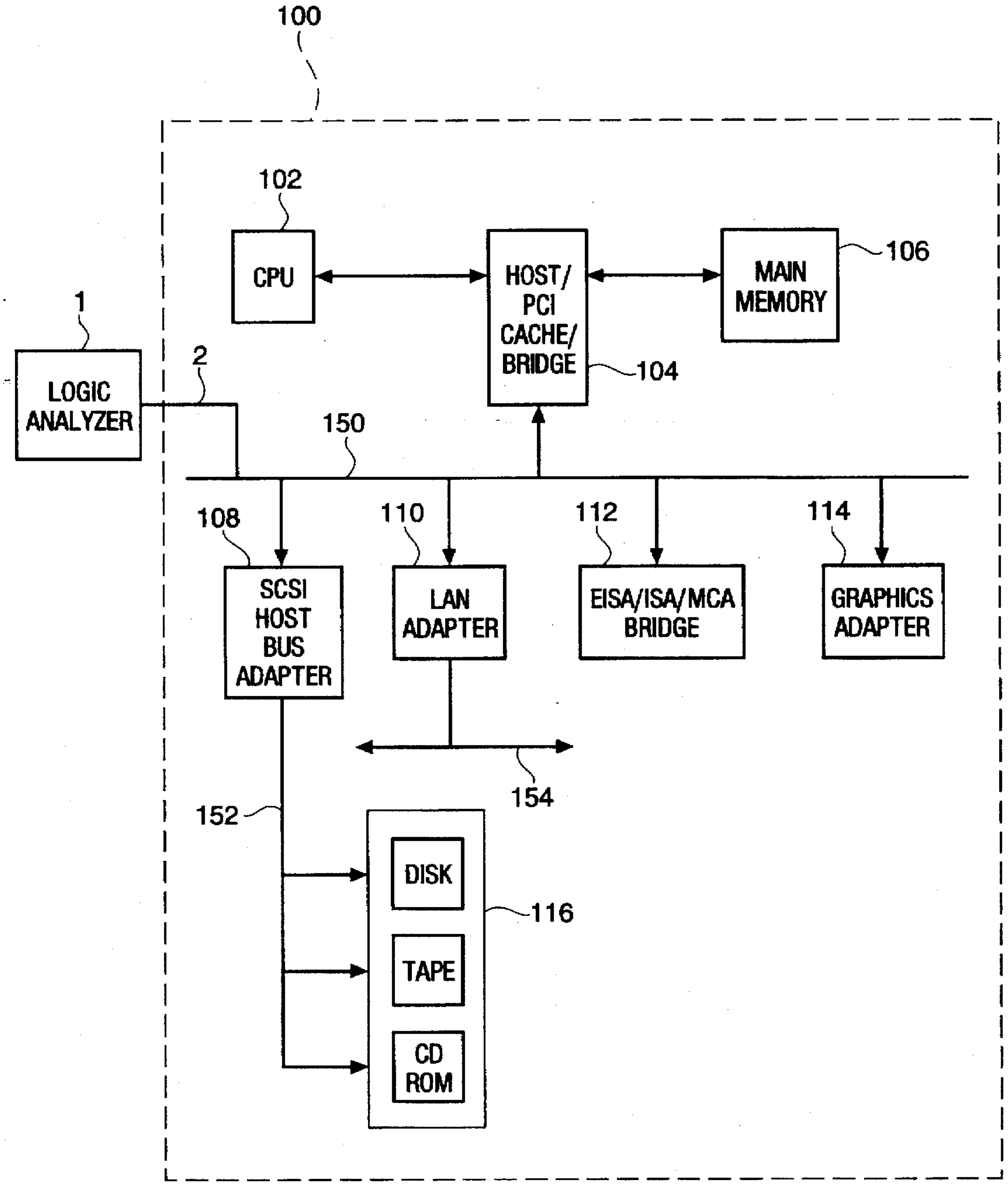
FIG. 1 is a block diagram depicting a logic analyzer operable in conjunction with the methods of the present invention connected to a typical computer system under test.

FIG. 1 is a block diagram of a typical computing system 100 to which a logic analyzer 1 is connected via probes 2 to aid in locating the root cause of a data corruption problem. System 100 includes CPU 102, connected to main memory 106 via host/PCI/cache bridge 104. CPU 102 fetches programmed instructions from main memory 106, and manipulates data in main memory 106, through host/PCI/bridge 104. Peripheral I/O devices are accessible by CPU 102 through host/PCI/cache bridge 104 on PCI bus 150. SCSI adapter 108, LAN adapter 110, bridge 112, and graphics adapter 114 are typical of devices attached to CPU 102 through the PCI bus 150. SCSI adapter 108 permits connection of the CPU 102 through PCI bus 150 to a plurality of storage devices 116 (such as disk, tape, and CDROM) via SCSI bus 152. LAN adapter 110 adapts signals on LAN 154 for use with CPU 102 via PCI bus 150. Bridge 112 extends the high speed PCI bus 150 to other lower cost, lower performance busses for attachment of additional (typically older) I/O peripheral devices. Graphics adapter 114 connects CPU 102 through PCI bus 150 to high performance graphic display screens.

As noted above, system 100 may be a general purpose computing system or may be a special purpose electronic device having the I/O architecture described above embedded therein. For example, special purpose network/communication devices and test equipment often embed an I/O architecture similar to that described above though the user interface for such devices limits their use to special communication or test functions. Similarly, many electronic test devices such as oscilloscopes, in circuit emulators, and even logic analyzers themselves, embed such a powerful, general purpose I/O architecture but limit the user to certain specific applications rather than general purpose computing applications. Therefore, as used herein, a "host computer" or "main processor" and an "intelligent I/O interface" may reside within a general purpose computing system or any special purpose electronic device having a similar I/O architecture embedded within.

To help reduce the processing load on CPU 102 related to low level processing of I/O functions for peripheral devices, typical adapters 108–114 include significant processing capabilities to perform I/O requests on behalf of CPU 102. A common interface structure for such intelligent I/O interface cards is a shared memory structure such that both CPU 102 and the intelligent I/O adapters (108–114) may access information stored in main memory 106. CPU 102 simply constructs a queue of command/buffer descriptor blocks in its main memory 106, informs an appropriate I/O adapter (108–114) of the starting address of the queue of descriptors, and then simply awaits a signal of completion of the processing of the queued descriptors by the selected intelligent I/O adapter. If a data buffer is to be exchanged as part of the requested I/O processing for a particular descriptor, then that descriptor points to a location in main memory 106 where the buffer may be found for the requested data exchange.

The intelligent I/O adapter (108–114) retrieves a next descriptor from main memory 106 and performs the requested I/O function processing. If the I/O function request found in the descriptor requires use of a data buffer for the exchange of data, then the requested exchange is performed using the identified buffer. These descriptors are often referred to as command descriptors because they describe the I/O request to be performed. As used herein, the descriptors are also referred to as buffer descriptors because they point to the location of a buffer in main memory used to perform the requested I/O function.

Logic analyzer 1 is connected to PCI bus 150 via probes 2 to monitor and capture state logic information exchanged between CPU 102, main memory 106, and the intelligent I/O adapters 108–114. The methods of the present invention are operable on logic analyzer 1 to aid the engineer in analyzing the exchange of information over PCI bus 150 pertaining to buffers and buffer descriptors. As discussed above, such analysis at the exchange of information between CPU 102 and one or more intelligent I/O adapters 108–114, as captured in state logic data by logic analyzer 1, may be useful in isolating the root cause of a data corruption failure in such a computing system.

One of ordinary skill in the art will readily recognize that such analysis as performed by logic analyzer 1 operable in conjunction with the methods of the present invention is equally applicable to any bus structure. PCI bus 150 is merely exemplary of a common bus standard in common use at the present time. Likewise, as noted above, one of ordinary skill in the art will readily recognize that the methods of the present invention operable on logic analyzer 1 may be applied to the debug of any electronic device using a similar I/O architecture to that shown in FIG. 1. General purpose computer system 100 is exemplary of a common device which utilizes such an I/O architecture wherein intelligent I/O interface cards (e.g., 108–114) access information generated by a controlling processor (e.g., CPU 102) in a shared memory (e.g., main memory 106). One of ordinary skill in the art will readily recognize that computing system 100 of FIG. 1 may represent many equivalent computing environments including a single board computer, with all components highly integrated thereon, and embedded within a special purpose computational component (e.g., for example, a networking bridge, switch, or router device).

Figure 2:
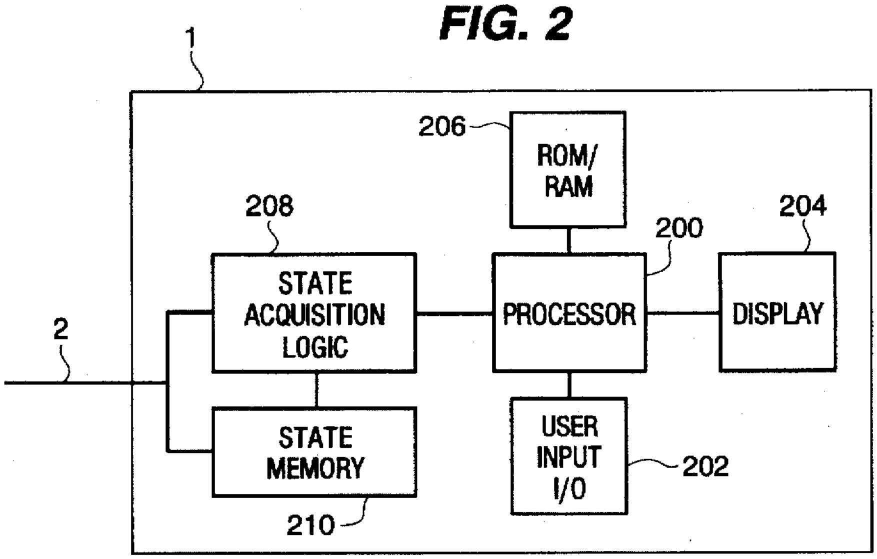
FIG. 2 is a block diagram depicting a self-contained logic analyzer including an embedded processor and display on which the methods of the present invention are operable.

The methods of the present invention (discussed in detail below) are operable on a computer in conjunction with a logic analyzer. Modern logic analyzers incorporate many (if not all) aspects of a general purpose computer as shown in FIG. 2. The methods of the present invention are therefore operable directly within a logic analyzer having such general purpose computational and display capabilities. Logic analyzer 1 as shown in FIG. 2 receives state logic data from probes 2 which is processed and stored as required by state acquisition element 208 in state memory element 210. Processor 200 controls state acquisition element 208 to configure the state acquisition parameters and to retrieve the resultant state logic data from state memory 210. As in most general purpose computing systems, processor 200 is connected to user input I/O 202 (such as keyboards and pointer devices) to receive user inputs and parameters. Processor 200 is also connected to display 204 to present information to the user of the logic analyzer. RAM/ROM memory 206 is used by processor 200 to manipulate variables and to store control program instructions. The methods of the present invention may therefore be integrated with the standard control programs in a logic analyzer, they may be stored and retrieved from RAM/ROM memory 206, execute on processor 200, display their results on display 204, and receive user input from user input I/O 202.

Figure 3:
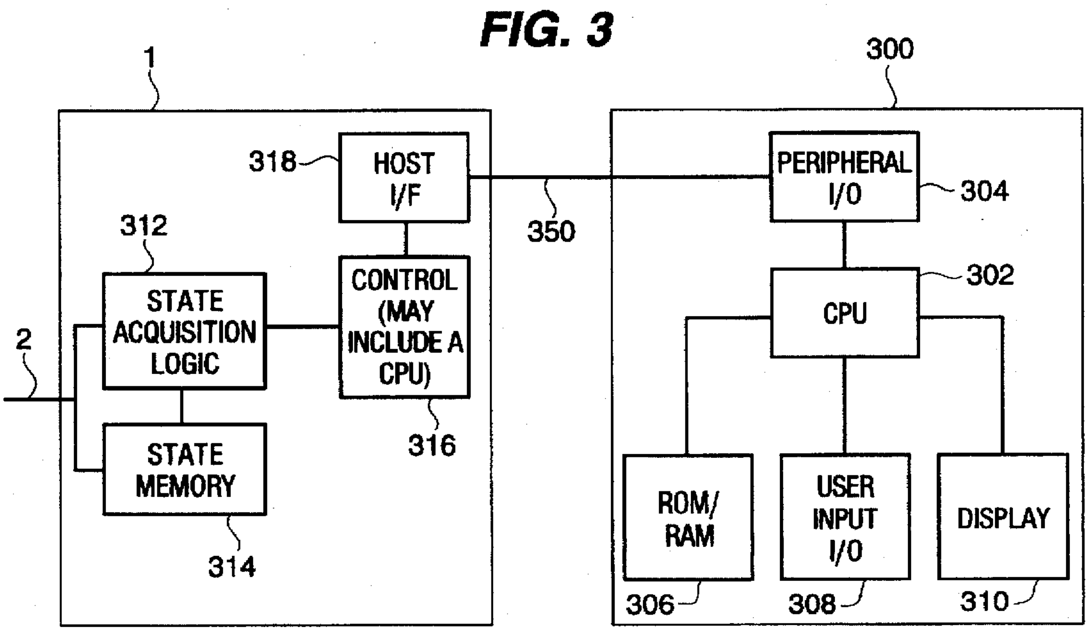
FIG. 3 is a block diagram depicting a logic analyzer used solely to capture state logic data and connected to a general purpose computer on which the methods of the present invention are operable to post-process the capture state logic data.

In the alternative, the methods of the present invention may be operated on a general purpose computer system 300 of FIG. 3 connected to logic analyzer 1 via bus 350 simply to retrieve the captured state logic data therefrom. As shown in FIG. 3, logic analyzer 1 receives state logic data from probes 2 under the control of state acquisition logic 312. The captured states are stored in state memory 314. Control element 316 (typically a computer) controls the operation of logic analyzer 1 and can communicate to an attached host computer system 300 through host interface 318 over bus 350. Bus 350 may be, for example, a SCSI bus, a LAN, an IEEE 488 bus, etc. as appropriate to the particular logic analyzer 1 and computer system 300. Computer system 300 includes CPU 302, connected to RAM/ROM memory 306, user input I/O 308 and display 310. Peripheral I/O element 304 connects CPU 302 to bus 350 for exchange of data with logic analyzer 1. In particular, computer system 300 retrieves captured state logic data from stand alone logic analyzer 1 via bus 350 then post-processes the retrieved data under the methods of the present invention to aid the engineer in locating the root cause of a data corruption error in the system under test (not shown). The methods of the present invention are therefore operable in a stand alone general purpose computer system connected to a stand alone logic analyzer. One of ordinary skill will also recognize that computer system 300 may retrieve captured state logic data via bus 350 or any other similar transfer mechanism. For example, the captured data may be written to a floppy disk on logic analyzer 1 and physically transferred to computer system 300.

One of ordinary skill in the art will recognize that the methods of the present invention may be applied within general purpose logic analyzers as well as embedded within special purpose protocol or bus analyzer devices or software modules.

State Analysis Methods of the Present Invention

Figure 6:
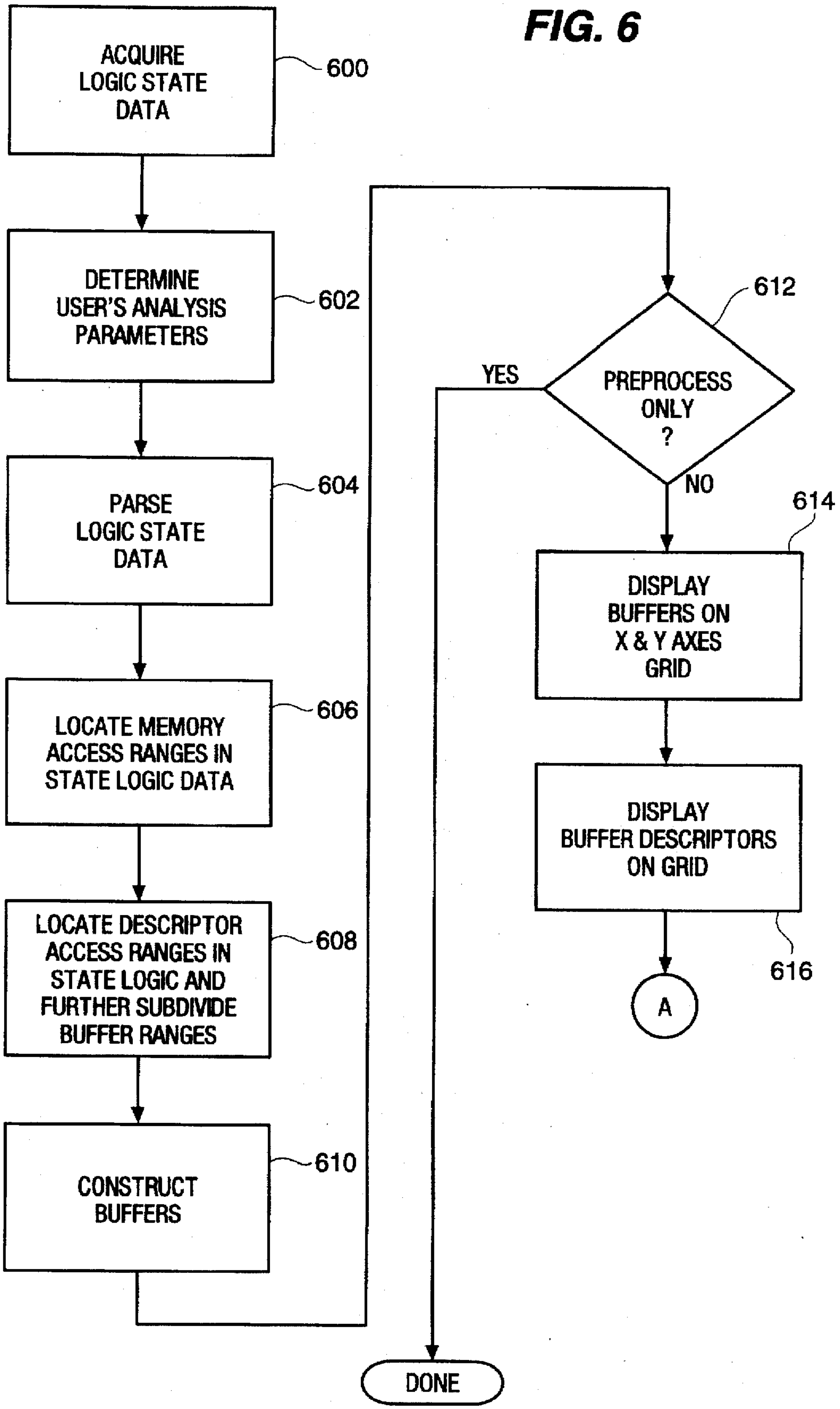
FIGS. 6–13 are flowcharts describing the operation of the methods of the present invention to analyze captured state logic data and to display useful information regarding buffers located and identified therein.
Figure 7:
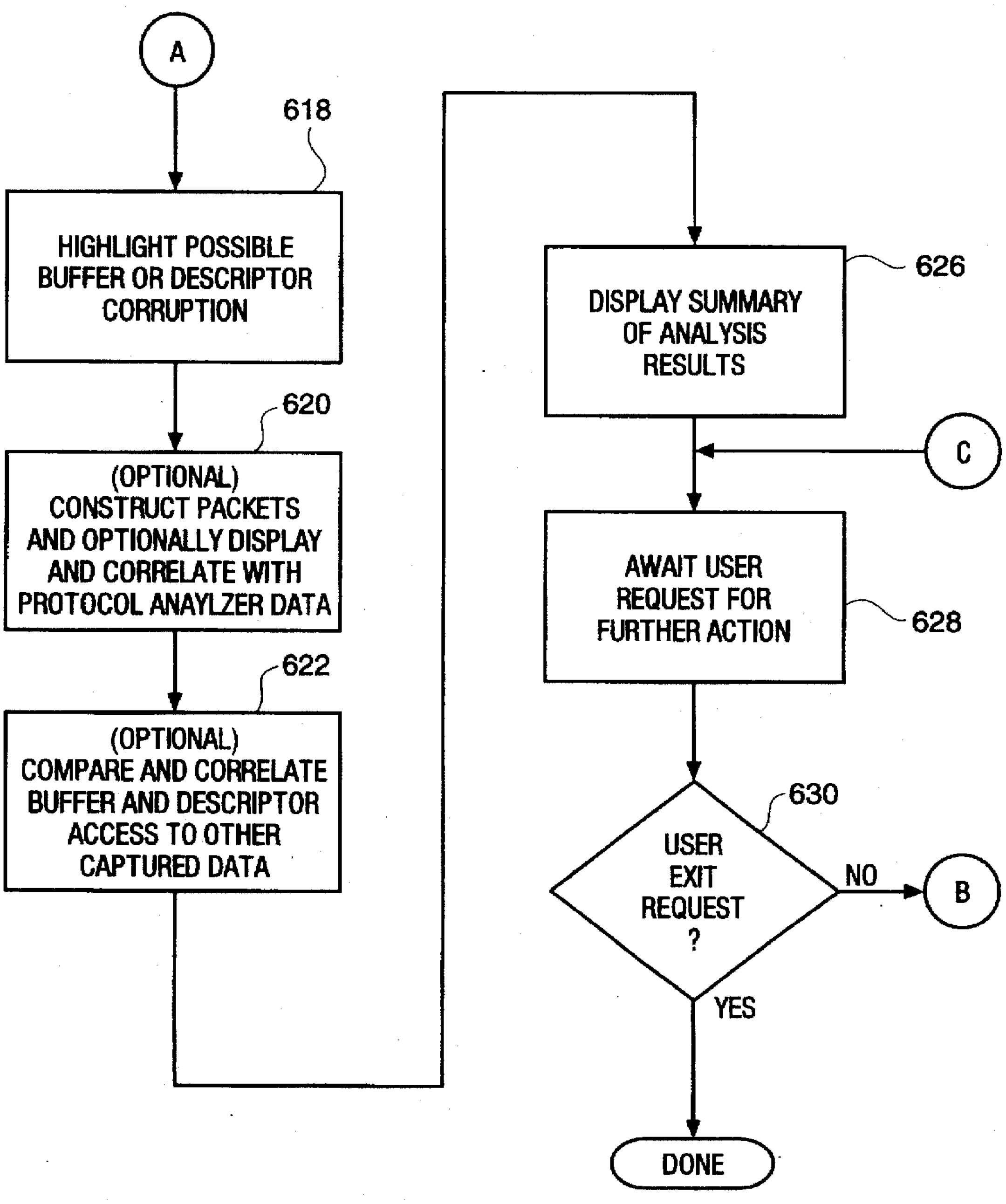
Figure 8:
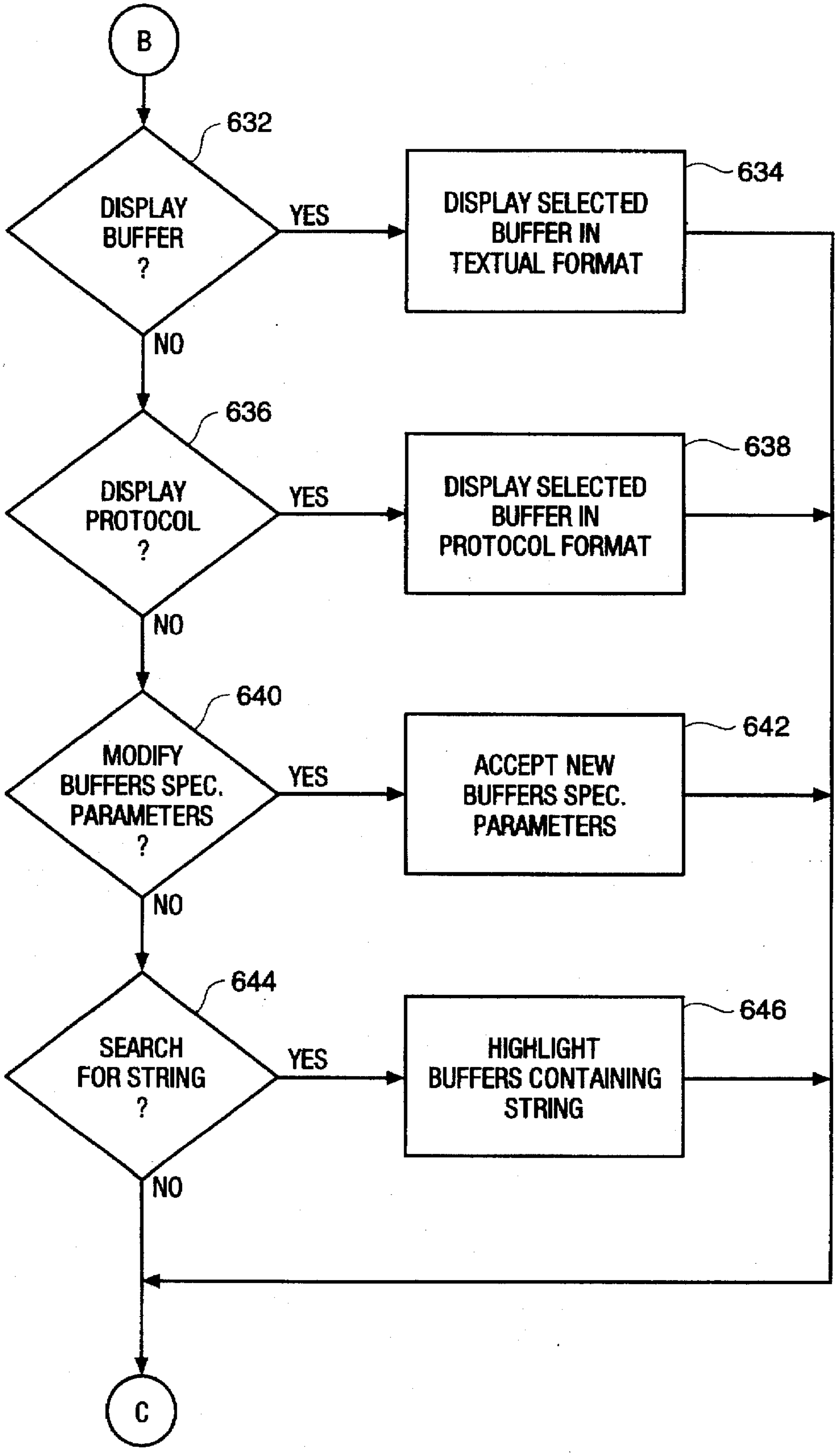

FIGS. 6–8 are flowcharts describing the high level operation of the methods of the present invention to analyze and display captured state logic. In particular, elements 600–612 of FIG. 6 perform fundamental analysis of captured state logic data to locate and identify memory access ranges in the captured state logic data and to classify the ranges as buffers or buffer descriptors. Elements 614 and 616 of FIG. 6 perform rudimentary display of the analysis results on the user's computer display screen. Elements 618–646 of FIGS. 7 and 8 then perform additional analysis of the identified buffers and buffer descriptors in the context of the particular application of the methods of the present invention to particular protocols and environments and display the results of that additional analysis. The additional analysis may also be driven by input from the user to direct the methods of the present invention to perform particular analysis steps and to display the captured state data in particularly useful ways. The particular analysis and display steps of the methods of the present invention discussed with respect to FIGS. 7 and 8 are exemplary of analysis and display useful in a particular application of the methods of the present invention. Other similar analysis and display steps for other particular applications and data exchange protocols will be evident to one of ordinary skill in view of the teachings and examples presented herein.

Element 600 of FIG. 6 is first operable to acquire state logic data. Operation of element 600 is dependent upon the structure of the logic analyzer and computing system upon which the methods are operable. As shown above in FIG. 2 wherein the methods of the present invention are operable within the logic analyzer, element 600 is operable within processor 200 to retrieve the captured state logic data as stored in the state memory 210. If, as shown in FIG. 3, the methods are operable on a stand alone general purpose computer, then element 600 is operable to retrieve the captured data from the connected logic analyzer (e.g., over bus 350 of FIG. 3) or from a file transferred to the system (300 of FIG. 3) by other means.

Element 602 is next operable to determine the user's analysis parameters. A number of the parameters controlling the analysis and display of the state logic data are configurable by the user in accordance with the particular application of the methods of the present invention. The user must provide configuration information defining the type of bus being captured. For example, the user may select common standard busses such as PCI or VME or may define a custom bus configuration providing complete definition of the address and data bus layout in the captured state logic data. One of ordinary skill in the art will readily recognize that the methods of the present invention read or otherwise analyze configuration information within the logic analyzer to determine the bus configuration. The endian mode of the captured state logic data must be determined from user supplied configuration information. Lastly, the user must supply the maximum buffer size of the data buffers in the captured state logic data. If at least some of the buffers are contained in a contiguous pool of fixed size buffers in memory, knowledge of the maximum buffer size may be required to correctly identify proper buffer references from improper buffer references (as discussed in additional detail below).

Several other parameters are configurable by the user to improve functioning in particular application environments. Detailed use of these other parameters is discussed below. Among these other parameters (and preferred default values) are:

- buffer descriptor maximum size in number of bytes/words (preferably 64 bytes)
- maximum average read spacing in number of captured states (preferably 4)
- maximum average write spacing in number of captured states (preferably 3)
- maximum buffer state gap multiplier (preferably 150)
- offset of descriptor from the start of a range (preferably 0)
- length of descriptor information within a range (preferably 0)
- complex buffer pointer descriptor (for buffer pointers in descriptors less than full 32/64 bits or at odd positions in the descriptor), preferably comprises a bit mask (preferably 0xffffffff), a bit shift position (preferably 0), and an address offset (preferably 0).

Still other configurable parameters may be specified by the user in element 602 at the start of analysis, but these parameters may be easily modified during the operation of the methods of the present invention which display captured state logic data on the user's computer display screen. Exemplary of such configurable parameters are:

detail level of range descriptions (i.e., range ID number, range start address, range end address, range size, and combinations of the above grouped into standard display formats such as "tight", "normal", and "wide")

ASCII, EBCDIC, hexidecimal, or mixed display captured state logic data

ASCII, EBCDIC, or hexidecimal search mode buffer range filter specification to limit the data displayed to a particular address range (i.e., corresponding to a particular intelligent I/O interface).

The usage of the above configurable parameters is discussed, if and where appropriate, in additional detail below in association with the method steps which utilize the parameters. One of ordinary skill in the art will readily recognize that frequently used configuration parameter values may be stored by the user in files for later retrieval. In such cases, element 602 is operable to retrieve previously stored configuration parameters for operation of the methods of the present invention. Additionally, one of ordinary skill in the art will recognize that the bit width of these parameters may vary based upon the characteristics of the bus being analyzed.

Element 604 is next operable to perform a preliminary parse of the captured state logic data to convert it to an internal canonical format used in the data structures associated with the methods of the present invention. The format of the captured state logic data may vary in accordance with the features and capabilities of the specific logic analyzer. Element 604 therefore extracts the information needed for the analysis and display of the methods of the present invention. The extracted data is stored in data structures useful to the analysis and display of the methods of the present invention. In particular, element 604 extracts at least the following elements for each state in the captured state logic data:

address value data value corresponding to the address value read/write access status corresponding to the access to the address value memory or I/O space access status corresponding to the access to the address value state number (offset in the captured state logic data).

Other portions of the captured state logic data may be useful for analyzing and displaying information regarding particular bus applications. For example, some logic analyzers capture a time tag associated with each captured state. This timing information may be used by the methods of the present invention to analyze performance aspects of the system under test as represented by the captured state logic data. The data thus extracted from the captured state logic data is stored in an array of structures whose fields represent the above extracted elements. This array of memory references is then used to perform the analysis according to the methods of the present invention.

An owner identifier can also be added to each transaction in the captured state logic data which serves to designate what device on the bus originated the transaction. This can be useful when there are multiple entities sharing the bus. Color coding can be used to differentiate between the bus traffic from these multiple entities by displaying the bus traffic captured states corresponding to each owner identifier in a corresponding color code. The owner identifier may be supplied by information provided by a user, or may be automatically determined by methods of the present invention when sufficient information is provided in each captured state (when the bus signals include device identification information).

The parsed data extracted from the captured state logic data is stored in an array (referred to herein as a parsed data array) for reference by the following elements. In particular, elements 606–610 utilize the parsed data array to construct other data structure arrays. Element 606 analyzes the parsed data array to locate memory access ranges. Operation of element 606 therefore constructs an array of data structures which describe ranges of memory accesses in the parsed data array (referred to herein as a range description array). Elements 608 and 610 are then operable using the range description array and the parsed data array to identify buffer references and buffer descriptor references, respectively, in the ranges. Elements 608 and 610 therefore construct arrays of data structures which describe the defining parameters of buffer descriptors and buffers, respectively, referenced in the located ranges. Essentially, this core function of the methods of the present invention effectively locates memory accesses that are logically related despite the fact they may be sparsely scattered in the captured state logic data.

In particular, element 606 is operable to locate memory access ranges within the state logic data as stored in the internal data structures. A memory access range is a subset of the states of the captured state logic data having the attribute of identifying contiguous addresses. These memory access ranges may also be further subdivided based on information subsequently gathered or otherwise derived by the methods of the present invention.

Figure 9:
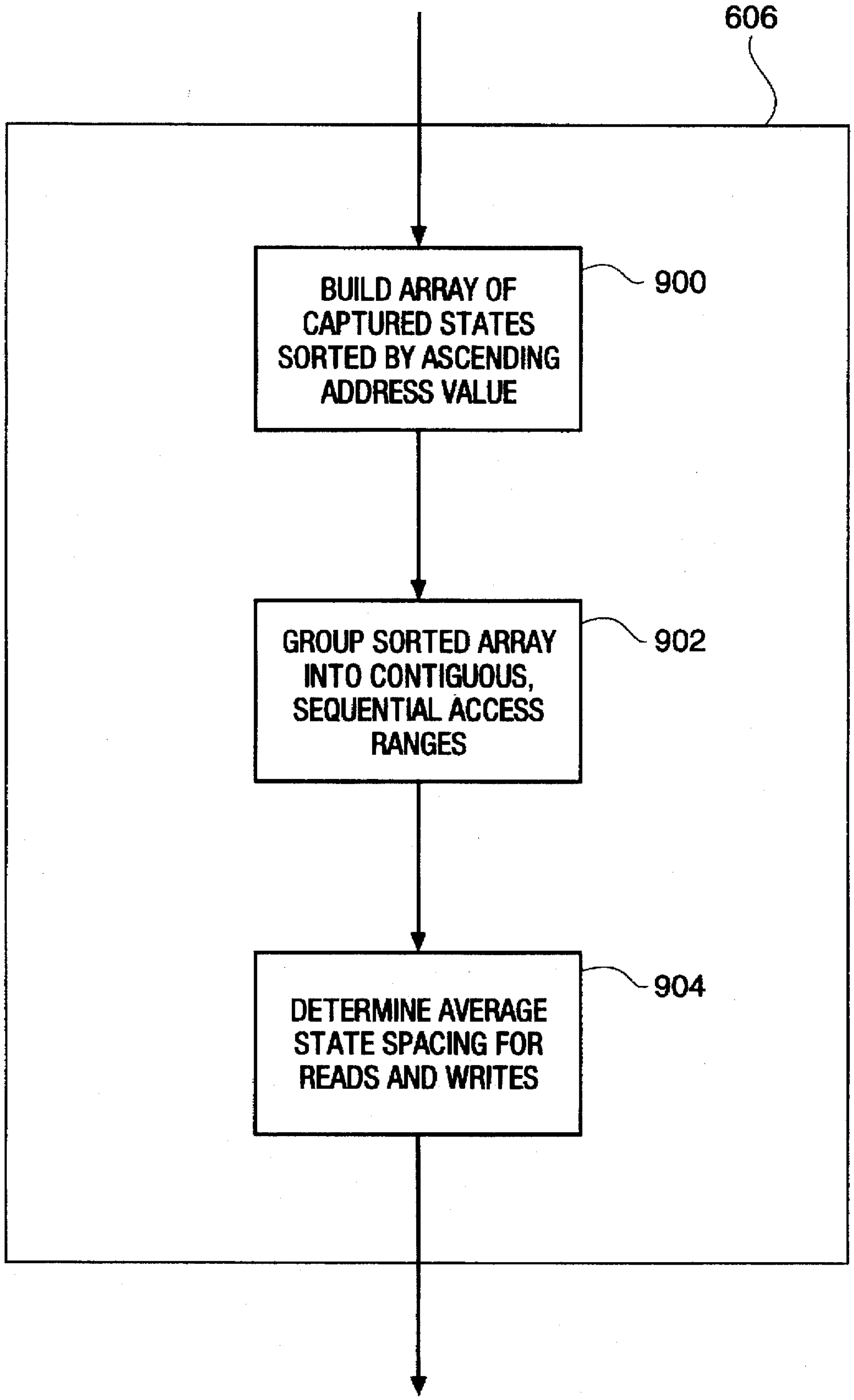

FIG. 9 is flowchart providing additional detail of the operation of element 606 to locate memory access ranges in the captured state logic data. In particular, element 900 of FIG. 9 builds an array from the captured data discussed above sorted in ascending order of address value. The sorted array is then grouped by operation of element 902 according the property of contiguous, sequential address increments. The contiguous sequential property is determined by the address of the transaction. In particular, an address of a memory access in a buffer must precede the address of the next memory access in the buffer. The specific address increment value is determined from the particular bus and application (e.g., four or eight bytes in the case of 32 and 64 bit PCI busses, respectively).

Element 904 is then operable to determine the average spacing of the memory accesses which comprise the identified memory access range. The average spacing is the average number of captured states in the captured state logic data between consecutive memory references in the range. As noted elsewhere, other data in the captured state logic data may include timestamp values. In such a case, the average spacing may be determined based upon average time differentials between consecutive captured states of the range.

Referring again to FIG. 6, element 608 is next operable to locate memory access ranges which likely correspond to buffer descriptors. As noted above, buffer descriptors are data structures utilized in such shared memory I/O architectures to describe the I/O operation requested including a pointer to the data buffer associated with the read or write operation. Ranges which likely correspond to buffer descriptors may therefore be identified by their data content (e.g., containing pointers to a memory access range identified above by operation of element 606). Depending upon the buffer descriptors so located, memory access ranges may be subdivided to reflect the fact that multiple buffers appear to be referenced in a single memory access range identified as containing buffers.

Figure 10:
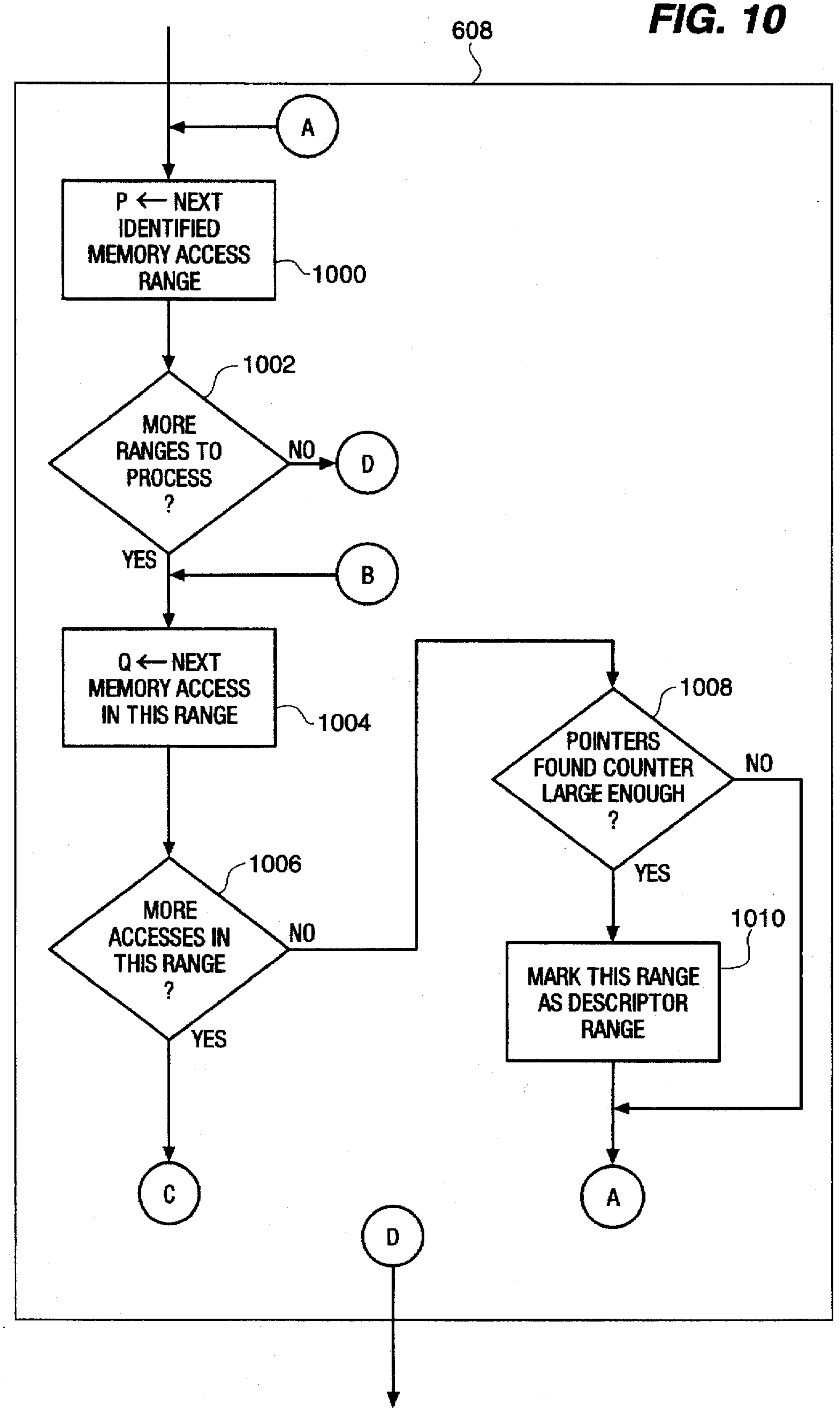
Figure 11:
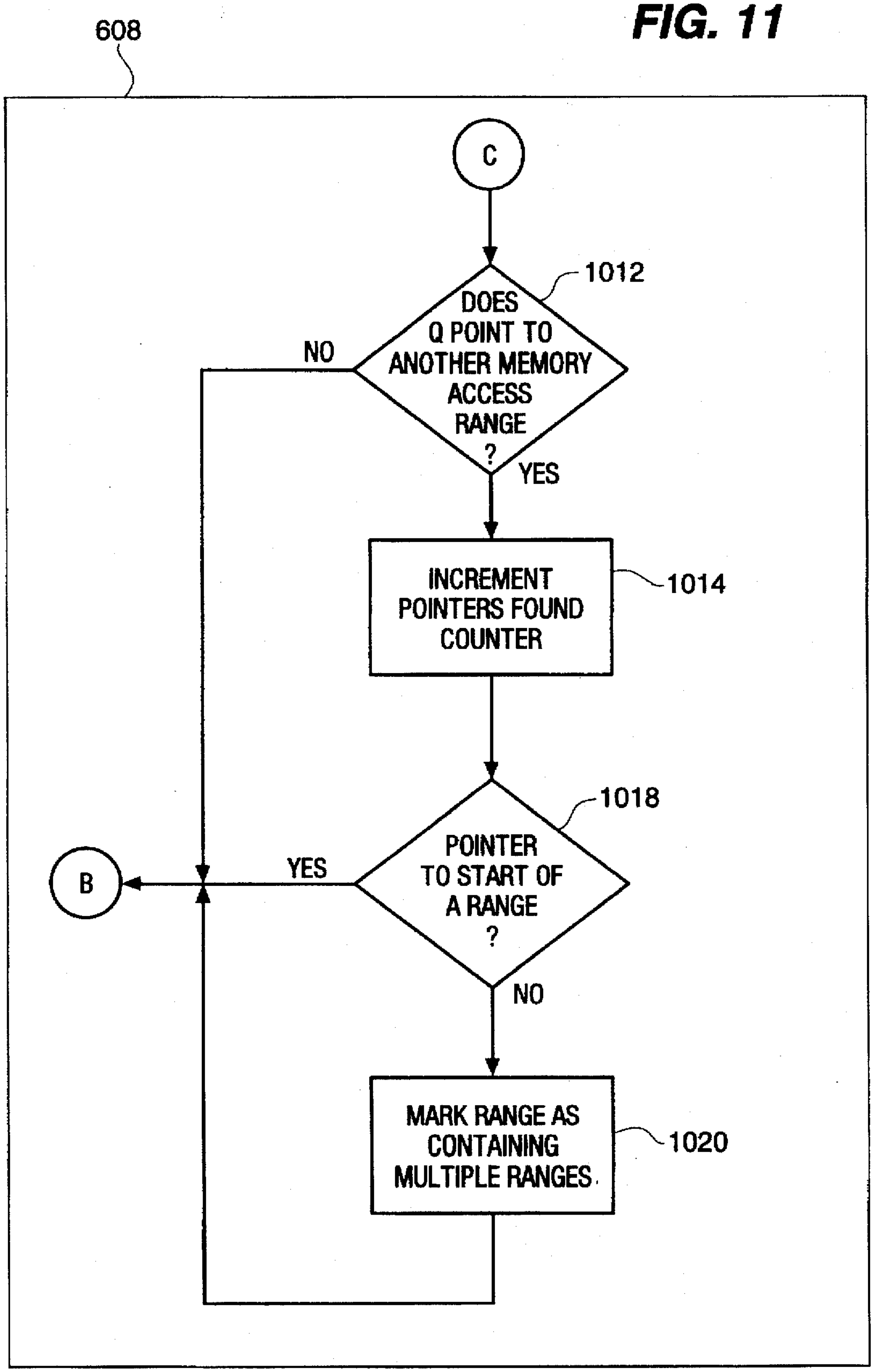

FIGS. 10 and 11 are flowcharts providing additional detail of the operation of element 608. Elements 1000–1006 of FIG. 10 are operable to initialize doubly nested loop constructs. The outer most loop, initialized by element 1000, processes each memory range tentatively identified by operation of element 606 above until element 1002 determines that no ranges remain to be processed. A pointer variable "P" is set by operation of element 1002 to the next range to be processed. For each range pointed to by P, elements 1004–1020 seek to determine whether the range is one containing buffer descriptors. Element 1004 initializes an inner loop construct to process all memory accesses within the present range P (up to the maximum length of a buffer as determined by the configuration parameters noted above). A pointer variable "Q" is set by operation of element 1004 to point to the next memory reference within the present range P to be processed. Each memory access Q in the present range P is then processed by elements 1008–1020 until element 1006 determines that no further memory accesses remain to be processed in the present range P.

The actual buffer address pointers in a descriptor may be (but are not usually) encoded in some manner. The user supplied configuration parameters (described above) may be used to decode the actual buffer pointer before they can be analyzed as described above in FIG. 10. This decoding process may involve, shifting, masking, adding offset values, etc., before the resultant value can be analyzed to determine its validity as a buffer pointer in a descriptor.

When element 1006 determines that all accesses to be processed in the present range P have been inspected to determine if they may represent buffer descriptors, element 1008 and 1010 are next operable to determine whether in fact the range appears to contain buffer descriptors. Specifically, element 1008 determines whether a counter indicates that the number of memory accesses which appear to be descriptors is high enough to conclude that the range in fact contains buffer descriptors. The number of memory accesses found in the range is divided by the count of pointers found therein. The result of this density calculation must be less than the buffer descriptor maximum size for the range to be identified as one which contains descriptors by operation of element 1010. If the comparison reveals that this density value for pointers found in the range is too high, then the memory range is not identified as a descriptor range by operation of element 1010. Whether the range is so marked or not, processing then continues with element 1000 to process the next range (if any) tentatively located by operation of element 606 as described above.

When element 1006 determines that another memory reference Q is to be processed in the present range P, processing continues with elements 1012–1020 of FIG. 11. Element 1012 is operable to determine from the data value corresponding to the memory reference Q whether the memory reference points to another memory access range tentatively identified by operation of element 606 above. If not, processing continues with element 1004 of FIG. 10 to process another memory reference in the present range P. If the memory reference Q of the present range P appears to point to another range in the tentatively identified memory access ranges, then a pointer found counter variable is incremented by operation of element 1014 to indicate that the present range P may represent a buffer descriptor range. As noted above, the counter value is used in the test of element 1008 of FIG. 10 to determine whether a sufficient number of memory references in the present range P appear to be buffer descriptors. The counter value is reset at element 1000 to start the processing of each range.

In general, buffer descriptors point to buffers though in some cases, a buffer descriptor may also include a pointer to another descriptor (such as a linked list of descriptors or indirect pointer references). In such a case, the range pointed to may be representative of another buffer descriptor range.

Element 1018 next determines whether the pointer in the apparent buffer descriptor of memory reference Q points to the start of another memory access range or to some other position within another memory access range. If the pointer in the memory reference Q points to a position other than the start of a memory access range, then element 1020 is operable to mark the pointed to range as possibly containing multiple sub-ranges to be further identified and separated (as discussed below). It should also be noted that pointers to buffers that are indirect (i.e., point to a range other than that of the actual buffer) will not cause subdivision of buffers in the indirect range. The indirect range is rather identified as a range containing buffer descriptors due to a sufficiently high density of pointers as compared to buffers within the range. Additionally, a pointer may point to a boundary location not aligned with the bus word size. Such a pointer is recognized as a valid pointer if the particular bus supports accesses to less than an entire bus word unit of data (e.g., pointer to a 16-bit or 8-bit boundary within a 32-bit bus word size). Processing then continues with element 1004 of FIG. 10 to process additional memory references within the present range P.

Figure 12:
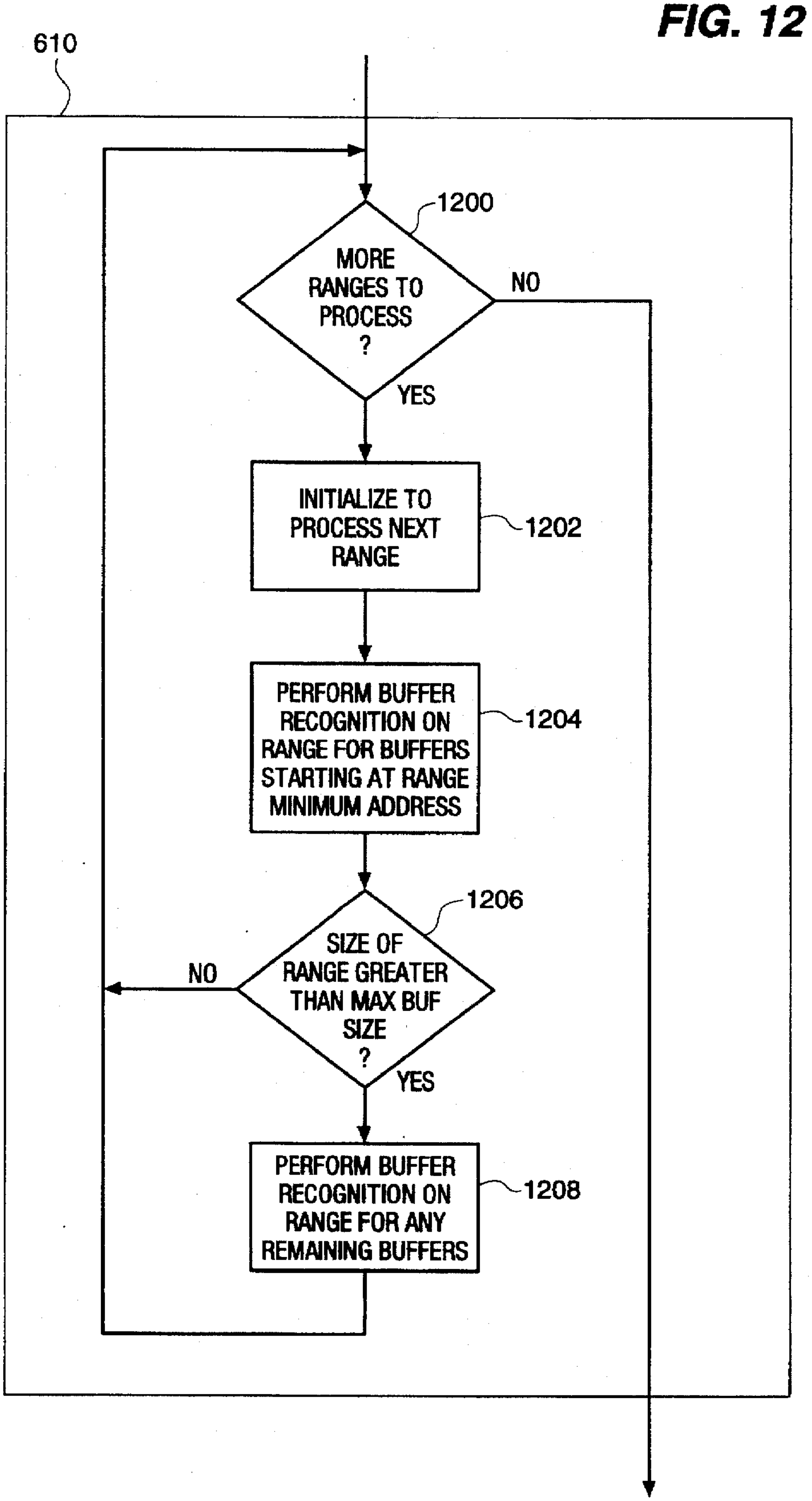
Figure 13:
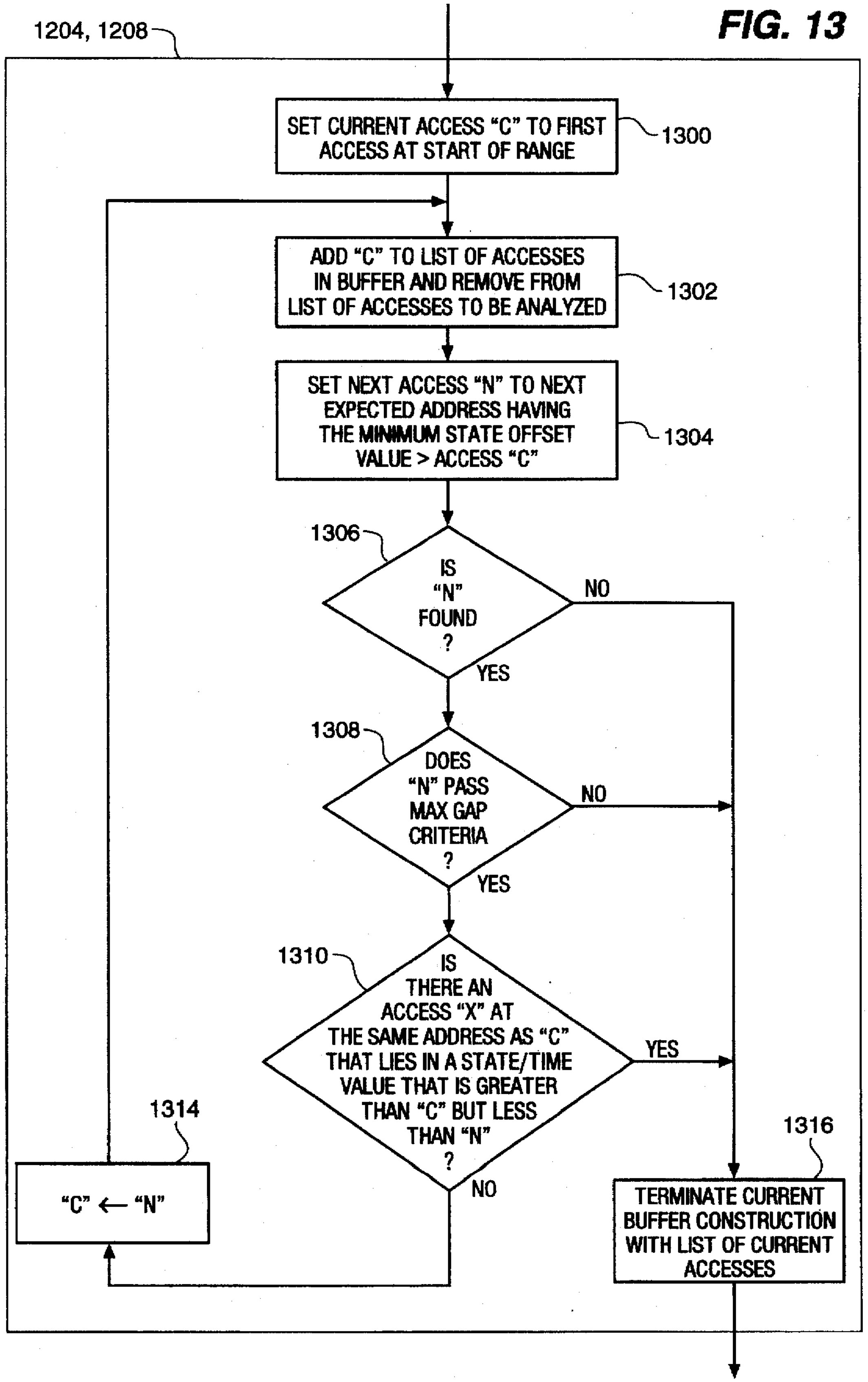

Referring again to FIG. 6, element 610 is next operable to construct buffers located in the memory access ranges identified above by operation of element 606 and not marked as buffer descriptor ranges by operation of element 608. Additionally, element 610 analyzes each possible sub-range within the ranges identified by operation of element 608. FIGS. 12 and 13 are flowcharts describing the operation of element 610 in additional detail.

Elements 1200–1208 of FIG. 12 are operable iteratively upon each range located by operation of element 608 above. Element 1200 of FIG. 12 is therefore operable to determine whether another range is to be processed by elements 1202–1208 of FIG. 12. If not, processing of element 610 is completed. Otherwise, element 1202 is next operable to initialize the processing required to locate buffers within the present range. Operation of element 610 generates a list of buffers identified within the range. Element 1202 therefore initializes the list of identified buffers for the processing of the present range.

Element 1204 performs the processing required to identify buffers within the present range which start at the low address of the range. Processing of element 1204 is recursive in nature to recognize buffers within the present range starting at a given address in the range. The processing of element 1204 is also referred to herein as the core buffer construction algorithm and is re-used to construct (identify or recognize) other buffers within the present range starting at locations other than the beginning boundary of the range. Details of the processing of element 1204 are discussed below with respect to FIG. 13.

Element 1206 of FIG. 12 is next operable to determine whether the size of the present range (measured in memory address locations) is greater than the maximum buffer size. The maximum buffer size is a configurable parameter of the methods of the present invention customized by the user to adapt the methods to a particular application or data exchange protocol. If the size of the range is less than or equal to the maximum buffer size, then buffer construction is completed for the present range. Construction of buffers which start at the beginning boundary of the range is assured to locate all valid buffers in that range. Processing therefore continues by looping back to element 1200 to process the next range. Otherwise, processing continues with element 1208 to construct (recognize) buffers which start at locations within the present range other than the starting boundary. Processing then continues by looping back to element 1200 to process additional ranges. Processing of element 610 is completed when element 1200 determines that all ranges have been processed for the purpose of constructing buffers therein.

Elements 1204 and 1208 perform similar processing by reusing the processing of the core buffer construction algorithm. The detection of buffers at the start of memory ranges before those which may start at other locations within the memory range is a heuristic which aids in correctly identifying proper buffer accesses from potentially corrupting memory accesses in the memory range. One of ordinary skill in the art may readily recognize other heuristic tests which may be performed to aid in the recognition of proper buffer references as distinguished from other memory accesses within a range.

A by-product of the processing of element 610 is the construction of an array of data structures describing each buffer identified (constructed) by the core buffer construction algorithm. For each such identified buffer, a data structure includes the following fields:

the buffer data contents (as a hexidecimal, ASCII, or EBCDIC string);
the buffer label (name) assigned to the buffer;
the starting address of the buffer;
the ending address of the buffer;
the starting time tag of the buffer;
the ending time tag of the buffer;
the starting state number (state offset) of the buffer;
the ending state number (state offset) of the buffer; and
corruption flag (initially reset and set by corruption detection below).

Referring again to FIG. 6, element 612 next determines whether the user requested the mere preprocessing of the captured state logic data. The processing of elements 600–610 capture state logic data and convert the captured data into data structures useful in the later display of buffers and buffer descriptors found in the captured data. These data structures, an internal representation useful to the display steps of elements 614–646, may be saved for later viewing. If element 612 determines that pre-processing of captured state logic data was requested, the internal representation data structures are saved in persistent storage associated with the methods of the present invention and the method completes processing. Otherwise, processing continues at element 614 to begin displaying the analysis results from the internal data structures generated by analysis of the captured state logic data. One of ordinary skill in the art will readily recognize that the methods of the present invention may be initiated at step 614 supplied with pre-processed captured state logic data previously saved in persistent storage by earlier operation of elements 600–612.

Analysis Display and User Interface

Figure 4:
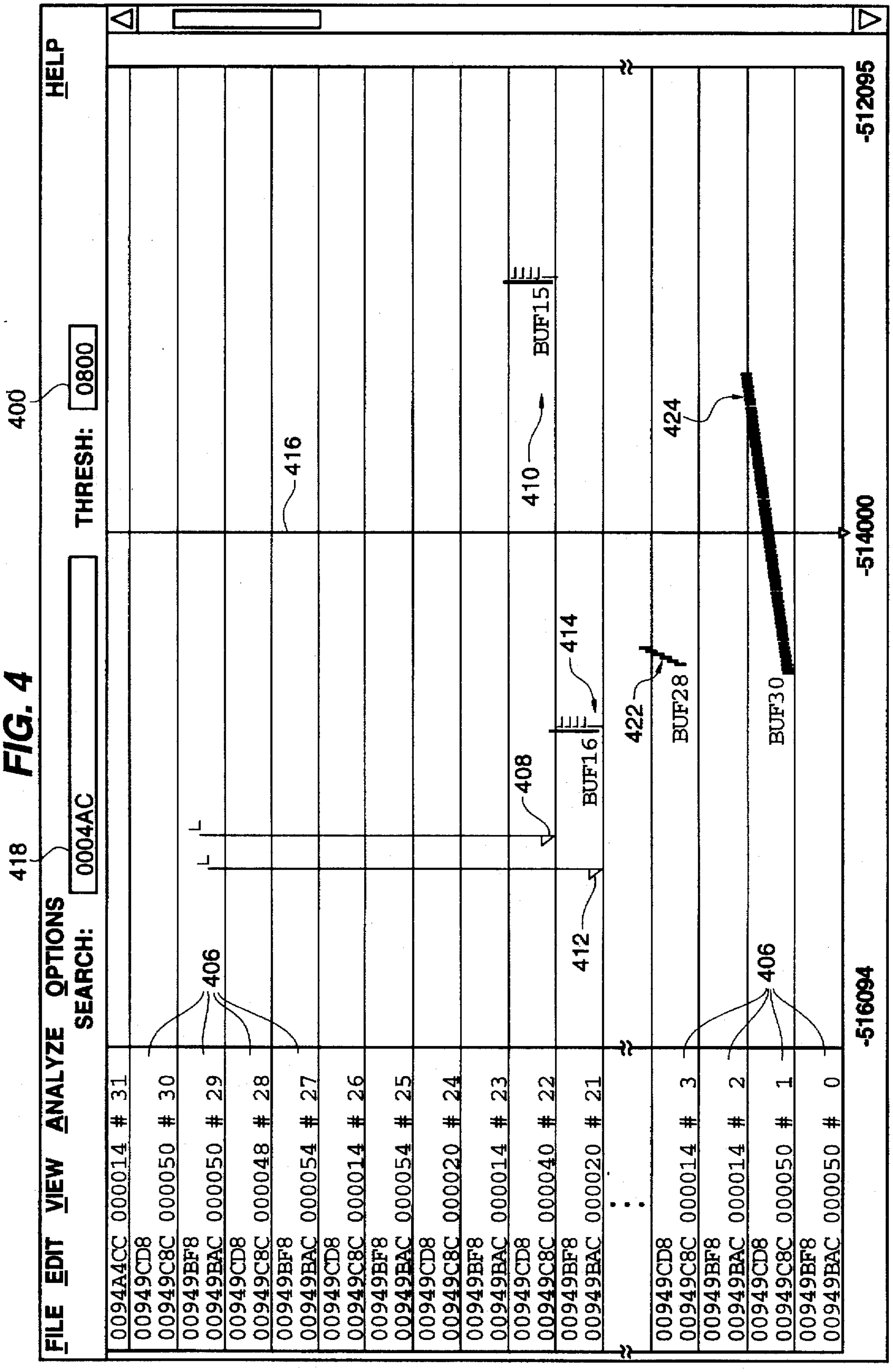
FIG. 4 is an exemplary screen display generated by operation of the methods of the present invention to display buffers and associated buffer descriptors located and identified by operation of the methods of the present invention upon captured state logic data.
Figure 5:
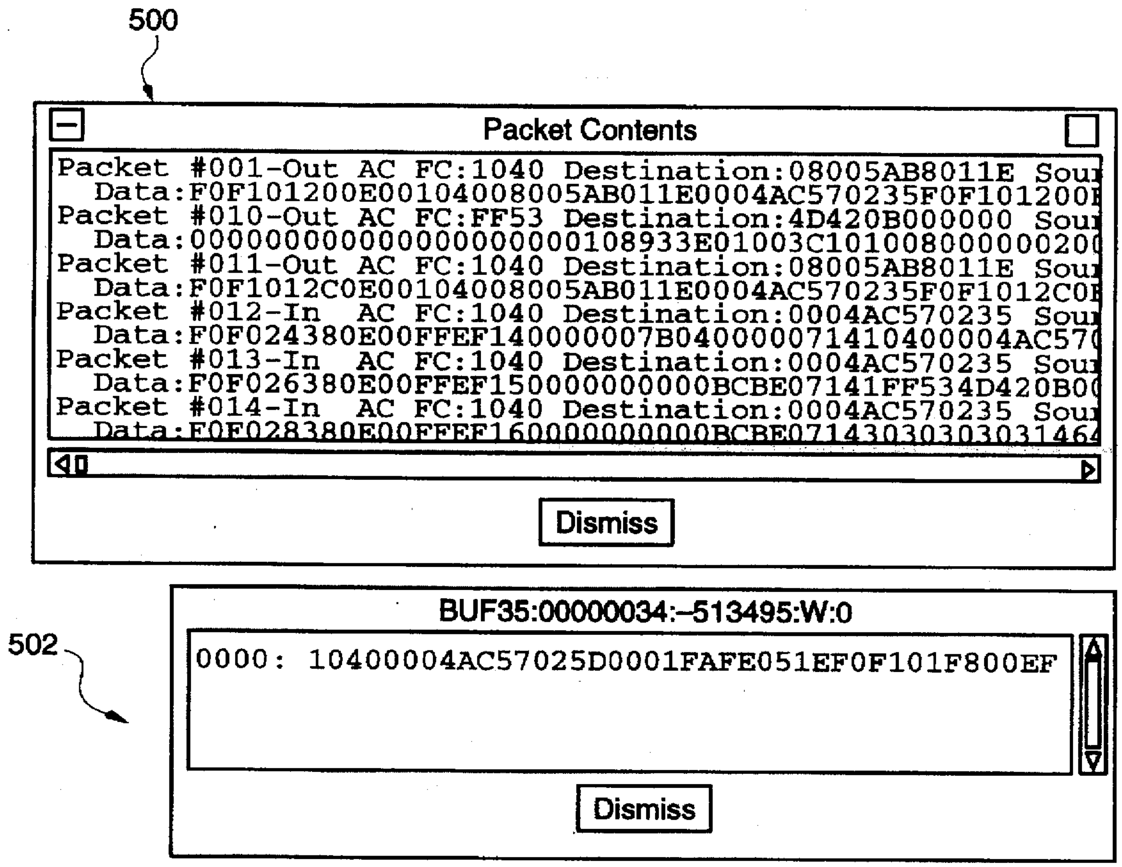
FIG. 5 is an exemplary screen display generated by operation of the methods of the present invention in response to a user request to display captured state logic data in textual form both as raw data and as data interpreted in accordance with a protocol specification.

The results of the buffer and buffer descriptor analysis performed by operation of elements 600–610 above are presented to the user along with further, optional analysis by operation of elements 614–646 of FIGS. 6–8. FIGS. 4 and 5, discussed above, are exemplary computer display screens for presentation of the analysis results. In particular, element 614 displays the constructed buffers on the grid display of FIG. 4. The Y-axis of FIG. 4, as noted above, presents the address ranges identified in the captured state logic data while marks along the X-axis in the row (band) corresponding to the range indicate particular captured states indicative of a reference to a memory Location in the range.

To visually aid the user in recognizing a that a particular collection of memory references in the memory range likely comprise a buffer reference; the collection of references is highlighted by connecting them with a color coded line. The line connecting the references helps the user visualize the references as a related set of memory accesses comprising a buffer reference. The color of the line may be used to indicate the type of references (e.g., reads versus writes, host access versus I/O interface access, etc.). In addition, a graphical indicator in the left margin of the display, wherein the memory range parameters are displayed, visually identifies the memory range as one which contains buffers.

One of ordinary skill in the art will readily recognize that the processing of element 610 (for example) to construct buffer references within the memory access ranges may be overlapped with the display generation of element 614. In such a manner, the display may be generated as the buffer references are recognized within the captured state logic data. Such parallel/concurrent processing techniques are well known to those of ordinary skill in the art.

Element 614 is further operable to generate and display a label (name) associated with each buffer displayed on the user's computer display screen. The user may later select a particular one of the displayed buffers by "right-clicking" the buffer's label. The data contents of such a selected buffer may then be viewed in a textual window either in raw hexidecimal form as well as ASCII or EBCDIC text formats. Element 502 of FIG. 5, discussed below, presents an exemplary window providing a textual display of a selected buffer.

Element 616 then adds the buffer descriptor indications to the computer screen display initiated by element 614 or as selected by the user. In particular, as noted above, the buffer descriptors are indicated on the grid display in a manner similar to the display of the buffers. In addition, arrow vectors are drawn between the displayed buffer descriptors and the corresponding buffer to which the descriptor points. The arrows aid the user in visualizing the association between access to a buffer descriptor and the associated access to the corresponding buffer.

The arrow is drawn vertically from the point of the buffer descriptor memory access to the corresponding memory range containing the buffer referred to by the buffer descriptor. The actual memory accesses which comprise the corresponding buffer reference (i.e., the corresponding DMA accesses) may occur some time later in subsequent captured states displayed in time order from left to right across the X-axis of the display. The horizontal spacing between the vertical line (arrow) from the buffer descriptor to the corresponding buffer reference (the DMA references) indicates the time delay (measured in numbers of states) between the two events. This spacing provides visual feedback to the user as to the timing between the buffer descriptor reference and the actual buffer reference. Such visual information provides the user with performance measurements of the underlying data exchange protocol in an easy to interpret format. As noted elsewhere, the captured data may include timestamp values for use in determining the actual relative timing between states of interest. In such a case, performance analysis may be presented in terms of actual time differences rather than in numbers of intervening states.

Element 618 of FIG. 7 is next operable to highlight buffer or buffer descriptor accesses which may represent data corrupting accesses. Several heuristic tests are applied in the processing of element 618 to locate likely corrupting access to buffers or buffer descriptors. For example, write access to a buffer content before previously written data is read therefrom likely indicates a corrupting access to that buffer. Many other heuristic tests may be applied to identify potentially corrupting memory accesses to identified buffers and buffer descriptors. Likely corrupting memory accesses so identified are then highlighted on the computer display screen. In particular, the methods of the present invention highlight a likely corrupt buffer or buffer descriptor by drawing a color highlighted (red) rectangular box around the identified buffer. One of ordinary skill in the art will readily recognize many other well known user interface techniques to highlight the potentially corrupting memory accesses.

A first form of buffer corruption recognized by the methods of the present invention is referred to herein as "local buffer corruption." First a rectangle is associated with the buffer mapped into the X/Y coordinate space of state number/address. The lower left corner of the buffer is the starting state which comprises the buffer or descriptor reference and the upper right corner is the ending state of the reference. The total number of memory accesses within the rectangle should equal the size of the buffer. Local buffer corruption is characterized by extra references within the rectangle.

Figure 14:
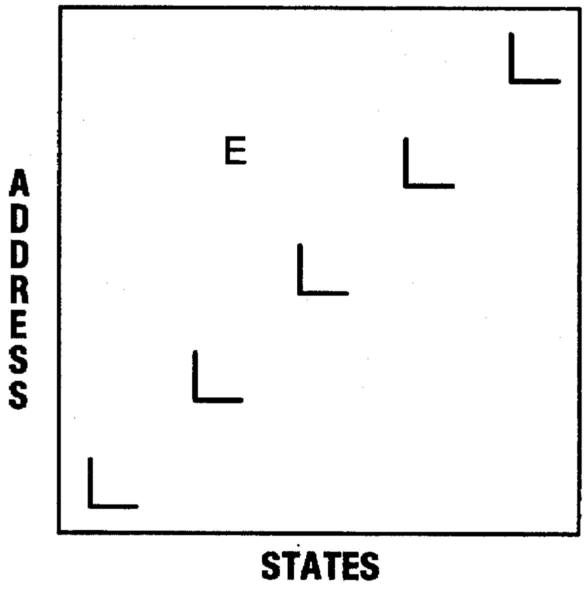
FIGS. 14–19 are block diagrams depicting various conditions used and recognized by methods of the present invention to locate buffers within captured state logic data and to recognize possible corrupting references thereto.

FIG. 14 graphically depicts the characterization of a local buffer corruption state. The letters placed in FIG. 14 represent captured memory accesses within a range of the captured state logic data. The box surrounding the letters represent the boundaries of the rectangle defined by the buffer or descriptor reference in the range. The memory accesses marked by the letter "L" represent legal memory references which comprise the buffer or descriptor reference. The memory access marked by the letter "E" in FIG. 14 represents an erroneous memory access. Such an erroneous memory access may be generated by an invalid pointer variable in a program or by an inappropriately initialized DMA reference by an I/O interface. Though the buffer represented in FIG. 14 is comprised of five legal memory accesses (marked by "L" characters) , six accesses are located within the bounds of the rectangle of the buffer. This buffer of FIG. 14 may then be highlighted as possibly corrupted by local buffer corruption heuristic methods. The corrupt buffer reference is then highlighted by a graphical rectangle on the user's display screen as noted above. One of ordinary skill in the art will readily recognize that particular applications of the present invention for the analysis of a particular bus structure and protocol may be enhanced by heuristic tests which recognize duplicate memory accesses between related bursts of accesses. The methods of the present invention are therefore tuned for a particular application to account for several such characteristics of the particular bus structure or protocol.

Figure 15:
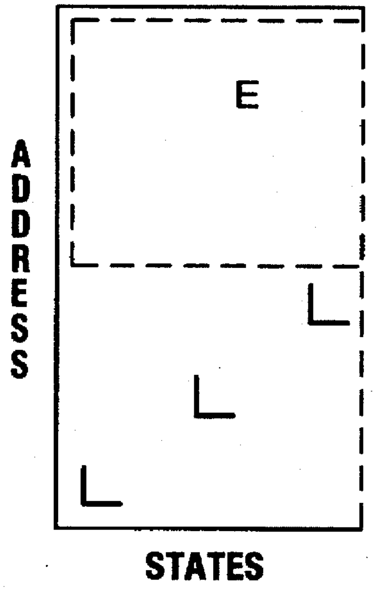

FIG. 15 is a graphical depiction of a buffer recognized as corrupt by high address buffer corruption heuristic methods of the present invention. In FIG. 15, as above in FIG. 14, the memory accesses marked "L" and "E" are indicative of legal and erroneous memory accesses within a memory range. As above, the box surrounding all marked states indicates the bounds of the rectangle of the buffer reference. A buffer reference may be characterized by high address buffer corruption when higher addresses of the buffer are apparently unused but accessed by erroneous memory accesses. The dashed box within the box of FIG. 15 indicates the bounds of a rectangle within the rectangle of the complete buffer wherein high addresses are intended to be unused. A memory access within this dashed box indicates a corrupt buffer recognized by the high address buffer corruption techniques of the present invention. One of ordinary skill in the art will readily recognize that the corruption depicted by FIG. 15 may escape recognition by application of the local buffer corruption techniques described above with respect to FIG. 14.

Figure 16:
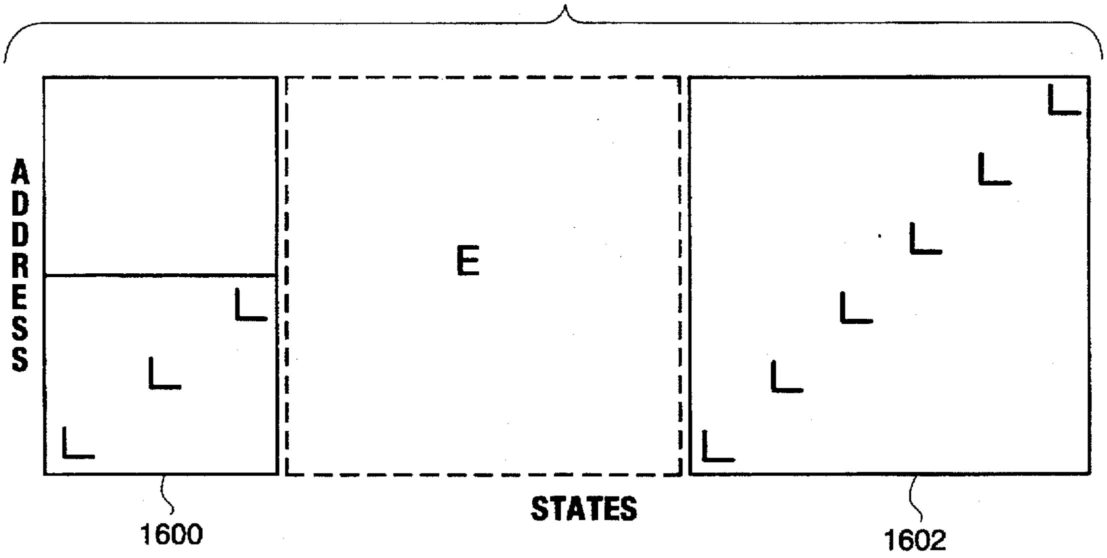

FIG. 16 is a graphical depiction of a buffer recognized as corrupt by inter-buffer corruption heuristic methods of the present invention. Two buffers references, 1600 and 1602, are shown in FIG. 16 within the memory range. As above, the rectangle bounding the buffers are indicated by a box around each buffer. "L" characters are indicative of legal memory accesses to the buffer within the memory range. A dashed box indicates the states between the two legal buffer references. Any memory access in this dashed box region between the two legal buffer references may be representative of a corrupting memory reference. The memory access labeled "E" in FIG. 16 within the dashed box between two legal buffer references is therefore indicative of an erroneous memory reference.

One of ordinary skill in the art will readily recognize that the high address buffer corruption test depicted in FIG. 15 and the inter-buffer corruption test depicted in FIG. 16 are only useful heuristic tests if buffer references start only at the starting address of the corresponding memory range. If, as noted above, the memory range is larger than the buffer size, then the erroneous memory accesses labeled with "E" characters in FIGS. 15 and 16 would be constructed as valid buffer references by operation of element 610 above. The methods of the present invention therefore aid the user in identifying likely buffer and descriptor corruption. The methods of the present invention "gracefully degrade" in this sense of providing the user with the raw information for further analysis when the heuristic methods cannot identify problems with certainty.

Figure 17:
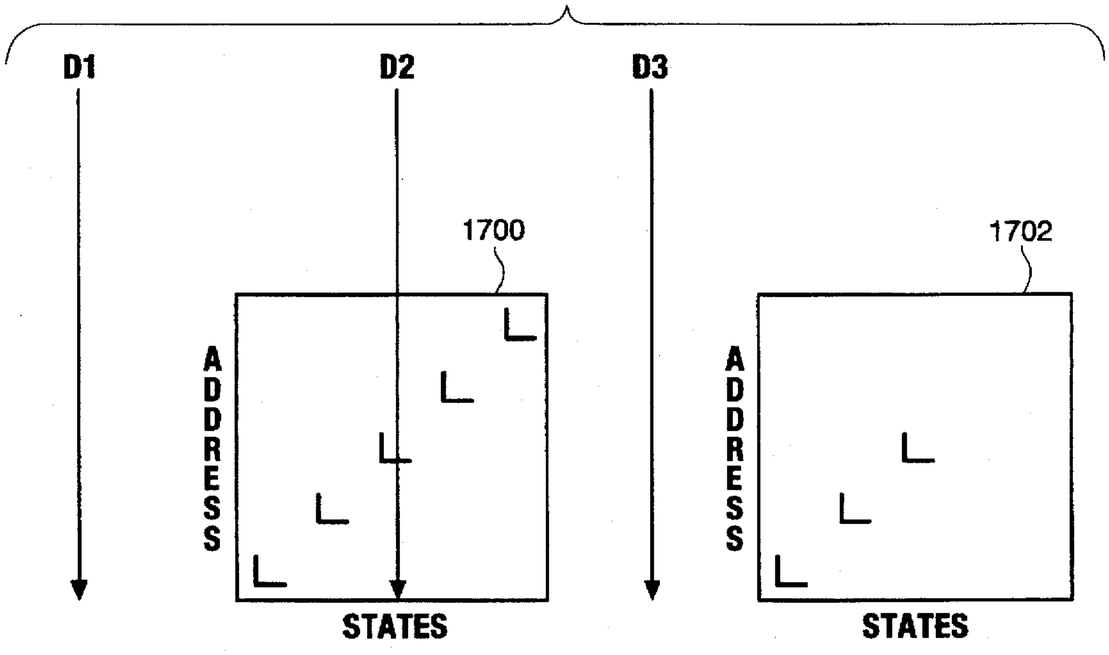

FIG. 17 is a graphical depiction of a buffer descriptor recognized as likely corrupt by buffer/descriptor interaction corruption heuristic methods of the present invention. As above, "L" characters denote legal memory accesses to a buffer within a memory range. Boxes surround the boundary of buffer references. Descriptors D1, D2, and D3 are references to a descriptor within a memory range of the captured state logic data. As described above with respect to element 616, arrows are drawn vertically from the descriptor reference to the start of the memory range containing the buffer to which the descriptor refers. D1, D2, and D3 are each therefore associated with an arrow directed to the memory range containing two legal buffer references 1700 and 1702. As shown in FIG. 17, descriptor reference D2 is extraneous and occurs in the middle of a valid reference to buffer 1700. The methods of the present invention locate such an extraneous, invalid descriptor reference by locating for each descriptor reference, all buffers in the memory range to which the descriptor points. If the rectangle of any buffer reference includes the state number corresponding to the descriptor reference, then the descriptor reference is likely erroneous and the descriptor is highlighted on the user's computer display screen.

Referring again to FIG. 7, element 620 is then operable to aggregate packets by concatenating buffers in accordance with information parsed from the referencing descriptors. This aggregation yields a list of packets (and their respective data contents) ordered by the starting state of the first buffer of each packet. As noted above, the user supplies parameter information describing the relative location of the packet length and/or other end of packet indicators within the descriptor addresses. A single packet may range in size from a single (even partially used) buffer to spanning of several buffers.

By applying such user specified parameters, element 620 is operable to construct logical packets based on the captured state logic data. The packet information may then be used as noted above to display the data contents of a particular packet, regardless of the number of buffers spanned by the packet, or to search the data bearing portions of the packet for a user specified search string. Element 620 is also operable to exchange packet related information with other analytical devices for further analysis. For example, element 620 may transfer its packet information to another protocol decode/display package or device. Such devices/packages perform specific processing of particular use for analysis of the particular data exchange protocol used. Similarly, element 620 may be directed to receive protocol data from another protocol analyzer device attached to the communication medium (e.g., a LAN protocol analyzer operating in parallel with the logic analyzer operable under the methods of the present invention). The received protocol data substantially overlaps the time period covered by the captured state logic and may therefore be correlated to the packet information gathered by element 620. Differences detected in correlating the gathered packet information and the received protocol data from an external analyzer may then be highlighted on the user's computer display screen. The protocol information, the results of attempting to correlate the protocol information, and any errors in the correlation may be display by operation of element 620 on the computer display screen in response to a user request to do so.

Element 622 is then operable to merge other state data captured from, for example, another logic analyzer capturing data exchanged between the host computer and its memory subsystem during the same period of time represented by the captured state logic data. A merged state data display is then presented on the users computer display screen.

By correlating and comparing the captured data from multiple analytical sources, capturing data from multiple points of the data communication paths, the methods of the present invention help the engineer rapidly isolate the root cause of a data corruption error. The data from alternate analytical sources is compared with the captured state logic data by merging the alternate source captured states with the captured state logic data of the present invention. For example, if the present invention is applied within a logic analyzer attached to the I/O interface within a host computer, the data may be advantageously correlated and compared with data captured by another logic analyzer attached to the associated host computer (e.g., the host computer's CPU/memory interface). The merge of the two sources of captured state logic data simply locates a first state in one of the source's captured data which corresponds to a state in the other source's. Subsequent states in the first source of captured state logic data are matched to corresponding subsequent states in the second source of captured state logic data.

When such correlated data from multiple sources is available, further comparisons may be performed by operation of elements 620 and 622 to further aid the user in locating the root cause of data corruption errors. In particular, a data flow heuristic method of the present invention may be applied to such correlated multiple sources of captured data to detect likely data corruption caused by inappropriate reading or writing of data in buffers. In particular, methods of the present invention "pair up" buffer references which write data into the buffer with corresponding read access to the buffer and vice versa. Each unit of data written to a buffer by the I/O interface card should be read by a memory reference from the host computer and vice versa. Both sides read and write memory references are available and correlated by operation of elements 620 and 622. Read accesses with no corresponding, preceding write access are flagged as likely causes of data corruption problems and appropriately highlighted on the user's computer display screen.

Element 626 displays a summary of the analytical results to help draw the engineer's attention to potential causes of a data corruption error. Summary information may include the following items:

Total number of memory ranges identified
Number of memory ranges identified as containing descriptors
Number of memory ranges identified as containing buffers
Number of unidentified memory ranges
Number of descriptors located
Number of buffers located
Number of likely corrupt buffers
Number of memory accesses
Number of bursts/transactions Element 628 then awaits user input (via keyboard, pointer device, or other well known user input techniques) to direct the methods of the present invention for further processing. If the user indicates that processing is complete (an exit request), then element 630 terminate processing of the methods of the present invention. Otherwise processing continues with element 632 of FIG. 8.

Elements 632–646 of FIG. 8 are operable to process particular user requests for continued processing of the methods of the present invention. In particular, elements 632 and 634 are operable to process a user request to display a selected buffer or buffer descriptor in raw data form. Window 502 of FIG. 5, discussed above, is exemplary of such a user requested display. Elements 636 and 638 are similarly operable to display a selected packet in protocol specific format. Window 500 of FIG. 5, discussed above, is exemplary of such a user requested display in protocol specific format. As noted above, the display of a single packet may span one or more buffers. One of ordinary skill in the art will readily recognize that the protocol information gathered by the methods of the present invention may be transferred to an external protocol analysis module for more thorough analysis specifically oriented to the protocol.

Selection of a buffer to be displayed in conjunction with elements 632–638 above is performed by any of several well known user interface techniques. For example, the user may use the pointer device (e.g., mouse) to point and click on the desired buffer. A pop-up menu then appears allowing the user to select a particular operation on the selected buffer. Alternatively, the user may move a selection indicator (e.g., a cursor) using keystroke input from the keyboard. In addition, as noted above, buffers on the computer display screen may include a textual label to identify the buffer for purposes of selection. A user then selects a particular buffer by entering the buffer name through keyboard strokes in response to appropriate prompts.

Elements 640 and 642 are operable in response to a user request to modify buffer specification or other parameters which control the operation of the methods of the present invention. As noted above, various parameters may be configured by the user to control the operation of the methods of the present invention both in recognizing/constructing buffer or protocol information and in displaying the results of that construction/recognition processing.

Elements 644 and 646 are operable in response to a user request to search for a particular target string in the buffers recognized in the captured state logic data. As noted above, the search string (target string) may be specified either in any of several convenient formats including; decimal, binary, hexidecimal, and textual (e.g., ASCII text). The string is located in the buffers identified by the buffer construction process above. Each buffer in which the search string is located is highlighted on the computer display screen to aid the user in locating the search string. As noted above, the search function of the methods of the present invention searches the re-constructed buffers for the search string regardless of the actual spacing (in time and state offset) of the individual memory references which make up the re-constructed buffer. Without the aid of the methods of the present invention, the user would be forced to manually search for the desired string. Such a manual search through the captured state logic data is complicated due to the potentially non-contiguous nature of the captured states which comprise a particular buffer. A user must therefore manually search through the captured state logic data while taking care to ignore intervening states which do not comprise portions of the particular buffer (or other memory range) being searched.

One of ordinary skill in the art will readily recognize that elements 644 and 646 are similarly operable to search buffer descriptors or memory ranges not specifically identified either as descriptors or as buffers. The user may select the target of the search operation through well known user interface techniques.

Following processing of the user's request (by element 634, 638, 642, or 646 above) processing continues by looping back to element 628 of FIG. 7 (at label "C") to await another user request.

Core Buffer Construction Algorithm

FIG. 13 provides additional details of the core buffer construction algorithm referred to above with respect to elements 1204 and 1208 of FIG. 12. The core buffer construction method (algorithm) is invoked with a parameter indicating the characteristics of the range to be inspected (start and end addresses), and a parameter indicating the whether construction of buffers in that range is to be limited to buffers which start at the starting address of the range.

In general the buffer construction algorithm proceeds by starting at a particular captured memory access ("C") and initializing a list of accesses comprising a buffer reference. The current memory access "C" is the first access on the initialized list. The method then proceeds searching for the next captured access which has the next higher value in its address field. This search for the next memory access terminates on the first of three conditions encountered: namely, 1) when such an access is found, or 2) when all memory accesses in the range being inspected have been processed without locating such an access, or 3) when a memory access is located having characteristics which heuristically define the end of a buffer of related memory accesses. Such an access may have the same address field value as access "C", but with a different type (read or write) or a different data field value and will have a state offset value intermediate the state offset value of "C" and that of "N" (the located memory access having the next higher expected address field value).

Figure 18:
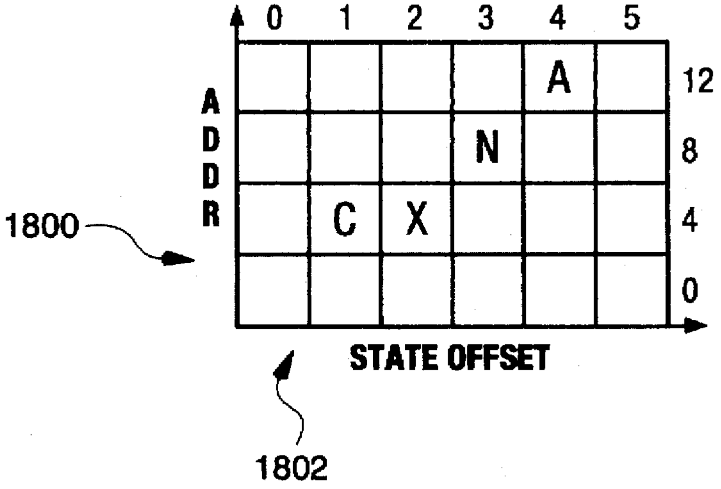
Figure 19:
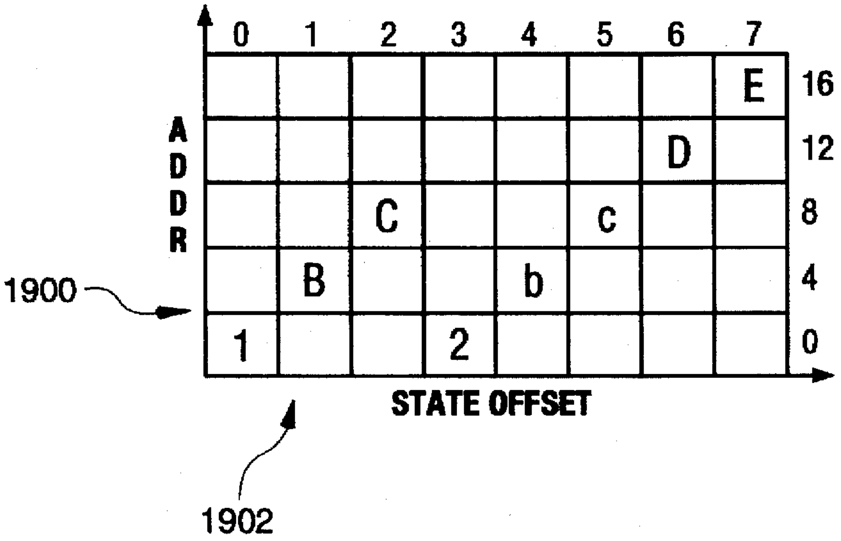

Case 3 above is a heuristic test that seeks to recognize a break between multiple, independent references to a buffer in a memory range. FIG. 18 depicts the conditions described by case 3 above. The X-axis 1802 of FIG. 18 is exemplary of the state offset of a subset of captured memory accesses with state offset index values from 0 through 5. The Y-axis 1800 is exemplary of the address of a memory reference in the corresponding state offset captured state data having address values 0–12 in increments of 4. The access "C" at state offset index 1 and having an address value of 4 is followed (in expected address sequence) by the access "N" at state offset index 3 and having the next expected address value of 8 (followed by access "A", etc. . . .). However, locating the access "X" at state offset index 2 having the same address value (4) as access "C" causes the search for the next access "N" to terminate unsuccessfully (as described above for case 3). FIG. 19 depicts a more typical occurrence of this case 3 relating to more typical captured data. The X-axis 1902 and Y-axis 1900 of FIG. 19 are as above for FIG. 18. The buffer reference consisting of accesses labeled "1", "B", and "C" is a first complete buffer reference (either valid or corrupt as determined later). The buffer reference consisting of accesses labeled "2", "b", "c", "D", and "E" is a second complete buffer reference. When constructing the first buffer reference, construction of the list of accesses comprising the buffer will terminate at access "C" because access "c" is intermediate access "C" and "D" and has the same address value as access "C."

When the search terminates due to condition 2 or 3 above, then the core buffer construction method of the present invention terminates construction of the present buffer. The list of accesses comprising a buffer reference is completed and the buffer represented thereby is reconstructed. If the search terminates, due to condition 1 above, then the memory access located in the search may represent a memory access which is part of the buffer reference. If the memory access is within the maximum gap parameter value from the location of the current access "C" (as measured by number of states or by time) then the new access is appended to the list of accesses comprising the buffer reference. The search method then repeats as above wherein the new access becomes the current access ("C") and the next access in the sequence is searched for. Eventually the search method will conclude under either condition 2 or 3 above. If the newly found access is not within the gap parameter spacing from the current access "C", then the search is terminated and the buffer reconstruction is completed for the current list of accesses.

The flowchart of FIG. 13 provides a detailed description of the core buffer construction algorithm discussed above. Element 1300 of FIG. 13 is first operable to set a variable "C" to the current access at the start of the range identified by a parameter passed to the method. Element 1302 then adds a reference to the access "C" to a list of states which may comprise a buffer reference in the captured state logic data. The method then proceeds to add other accesses to the list until a condition is met which terminates the method (as noted above). Elements 1302–1314 are therefore repetitively operable, adding references to accesses to the list which identifies a buffer reference, until a terminating condition is found.

Element 1304 is operable to set a variable "N" to refer to the next access in the range identified by a memory access to the next expected incremented address value in sequential address order and having a state offset value greater than that of access "C." It will be noted that the state offset value of access "C" is less than that of access "N" which is in turn less than that of any other access to the same memory address as that of access "N." The expected increment in sequential address is a configurable parameter as noted above to permit the methods of the present invention to be easily adapted to a variety of computing environments. For example, the next expected address increment may be 4 or 8 bytes for captured state logic data associated with a PCI bus of 32 or 64 data bits. Element 1306 then determines if the next access (referenced by "N") exists in the memory range. If not, the method terminates and processing continues with element 1316 discussed below. Otherwise, element 1308 is next operable to determine whether the number of states between the state offset of access "N" and access "C" is within the expected gap value. If the gap between consecutive address states is too large, the accesses are thereby heuristically determined to belong to separate buffer references and processing continues with element 1316 discussed below. The threshold value for the maximum gap between states representing consecutive address memory references in a single buffer reference is set as a configuration parameter as noted above. This permits the gap, indicative of bus timing and the computing environment under test, to be tuned to appropriate values for a particular bus structure or computing application. In other words, if the gap between access "N" and access "C" is greater than the maximum expected gap value, the method of FIG. 13 completes the construction of this buffer and processing continues with element 1316.

Element 1310 is then operable to determine if there exists a memory access "X" which has a state offset index value that lies between that of access "C" and access "N" and has the same address field value as access "C." FIGS. 18 and 19, discussed above depict such a condition. In FIG. 18, access "X" is intermediate accesses "C" and "N" and has an address value equal to access "C." Similarly, FIG. 19 depicts an exemplary access "c" intermediate accesses "C" and "D" with an address field value equal to access "C." When such an intermediate access exists in the memory range and is not identical to access "C" in terms of access type and data value, the next memory access "N" is heuristically determined to be a part of another buffer reference. In this case, construction of the buffer is completed and processing continue with element 1316. Otherwise, processing continues with element 1314 to update the reference to access "C" with the reference to access "N" and then continue the search by looping back to element 1302, adding the new access to the list of accesses in the buffer reference and repeating the search for another next access.

Each memory access added to the list of accesses in the buffer reference by operation of element 1302 is also thereby removed from the list of accesses to be further analyzed. Once a memory access is hereby recognized as an element of a particular buffer reference, it is no longer considered in the construction of other buffer references in the memory access range.

When the tests of elements 1306 or 1310 determine that the end of the buffer reference has been located in the search, element 1316 returns the list of memory accesses which comprise the buffer reference. The list of accesses is then used by the calling functions to further analyze the probability that a proper buffer access has been located. After a buffer reference is reconstructed by the method summarized above, a variety of heuristic tests are applied to the apparent buffer reference to determine whether it is likely a buffer reference or some other reference (such as perhaps a corrupting reference to the buffer). For example, a test may be applied to determine the average spacing of captured states between memory accesses of an apparently reconstructed buffer. If the average state spacing is outside predetermined (configurable) parameter values, then the reconstructed buffer may be "de-constructed" by returning the list of accesses comprising the buffer reference to the list of accesses available for further analysis by subsequent invocations of the buffer construction algorithm.

One of ordinary skill in the art will readily recognize many variants of the above described core buffer construction algorithm which achieve the same fundamental purpose of reconstructing buffer references within ranges of dispersed memory references in captured state logic data. For example, the above discussed methods may be modified to speed up buffer recognition by ignoring the gap between apparently consecutive memory accesses. Each memory access having an address field value that is higher than the previous access address value may be added to the list of accesses representing the buffer reference. Though elimination of the gap test speeds up buffer reconstruction, it may sacrifice accuracy in the reconstruction of memory accesses which are not in fact buffer references. Similarly, one of ordinary skill in the art may recognize that the tests for expected address increments may be eliminated. If the list of accesses to be analyzed in maintained in sorted order by increasing state offset, then each subsequent access which meets the state gap test criteria may be added to the list of accesses which apparently comprise a buffer reference. The address field values of each access may be ignored. The diminished accuracy of such performance enhancing heuristics is reflected in later recognition of possible data corruption instance which may not in fact represent data corruption. The best presently known mode of implementing the present invention therefore incorporates the additional tests discussed above to improve the accuracy of buffer reconstruction at the sacrifice of some speed in so doing.

Exemplary Computer Screen Displays

FIGS. 4 and 5 are exemplary computer screen displays which suggest one style of visually communicating to the user the analysis performed by the methods of the present invention. FIG. 4 each row (also referred to herein as a band on the display) of the table in FIG. 4 indicates a range 406 located by processing of element 602 of FIG. 6 discussed above. The parameters of each range 406 are shown at the cell to the left end of the row (band). The parameters displayed for each range 406 are the range start and end address (typically rounded to an appropriate address boundary for the system under test) and the length of the range. An ID number is assigned to each range 406 by the methods of the present invention and is also displayed in the leftmost cell of each row (band).

The remainder of each row (band) in the table of FIG. 4 contains markers identifying each memory reference in the associated range. The X-axis of the table of FIG. 4 is the offset index of the states displayed increasing from left to right. As shown in FIG. 4, 4000 captured states are displayed. The indices of the states displayed is indicated along the bottom of the table of FIG. 4 as -516094..-512095. The indices displayed match the index values used in the logic analyzer's storage of captured states in its state memory.

Each memory reference in a particular range 406 is shown by a small token mark. The horizontal position of the mark reflects the index value of the captured state logic corresponding thereto. The vertical position of a mark within the table row (band) for the range 406 reflects the precise address within the range (marks for lower addresses appear lower in the row for the range).

Since all rows (bands) used to display all ranges 406 are equally spaced on the table display, larger buffers appear denser in the vertical axis and elongated in the horizontal axis. This is due to the fact that the larger buffers must fit more memory accesses vertically in the same amount of space on the user's computer display screen as compared to smaller buffers or descriptors. Larger buffers appear horizontally elongated because of the increased number of captured logic states comprising the buffer reference instance. For example in FIG. 4, the buffer marked 422 in range 406 number ID 3 comprises approximately 20 (14 hex) memory accesses (in bytes). However, the buffer marked 424 in range 406 number ID 1 comprises 80 (50 hex) memory accesses (in bytes). Buffer 424 is therefore elongated horizontally, and denser vertically, as compared to the smaller buffer 422.

Though the X-axis of the table of FIG. 4 reflects captured state logic indices, and not time in a direct sense, it is always true that captured states shown to the left side of the table preceded the occurrence of captured states to the right side of the table of FIG. 4. Just as the methods of the present invention can heuristically detect probable data corruption events based upon the dispersion properties of buffer descriptor references and buffer references, the visual information presented to the user which serves to highlight buffer references and buffer descriptor references in the time domain aids the engineer in rapidly spotting possible anomalies in the capture state logic data.

As discussed above, element 608 of FIG. 6 is operable to associate buffer descriptors with the particular buffers to which they refer. This information is visually presented to the user as shown in FIG. 4 by drawing a directed vector from the buffer descriptor toward the corresponding buffer to which it refers. For example, two vectors, 408 and 412, are shown in FIG. 4 drawn from two descriptors found in range 406 number 29 and directed toward the start address of their respective referenced buffers, namely 410 and 414, respectively. This visual information permits the user to quickly view the association of buffer descriptors to buffers, to visualize possible data corruption where data in a buffer or descriptor is modified before properly used, and to visually estimate the time delays (measured in number of states along the X-axis) between references to buffers following setup of descriptors etc.

A vertical marker 416 may be positioned by the user using well known user input techniques with a keyboard or pointer device. The vertical marker may be used to select a particular portion of the table of FIG. 4 for detailed analysis by positioning the vertical marker to a particular state index. Having thus selected a particular state of the table of FIG. 4, standard user interface techniques may be applied to examine the captured state data in the visual vicinity of the vertical marker. By clicking the pointer device at the vertical marker position, a pop-up menu is displayed which allows the user to select a desired option for viewing the selected state logic data. The captured state logic data in the area surrounding the vertical marker position may be displayed, as noted above, in any of various formats in a separate window. By selecting and displaying several such locations, the user may readily view and correlate data from different portions of the captured state logic data.

When the captured state logic data is too densely presented on the standard computer display screen format, the user may employ well known user interface techniques to select a region of the display to be viewed in a zoomed window. The user selects a rectangular portion of the memory ranges on the display screen and clicks the pointer device to display a pop-up menu. The user may then select a zoom option to display the selected region of the computer display screen in additional detail. A new window is displayed with a table analogous to that displayed in FIG. 4 but with additional detail for each memory access (including, for example, address and data value for each access). Furthermore, a zoomed window display highlights pointers in colored text and graphics. The captured state logic data which was displayed within the selected rectangular region is shown in the new window's table.

Parameters used to heuristically identify buffers and buffer descriptors in the ranges of the captured state logic data may be altered by the user by entry of values into the "THRESH" window 400. The value in the "THRESH" window 400 determines the threshold value for identifying a buffer versus a buffer descriptor in the ranges located in the captured state logic data based upon length of the contiguous memory accesses.

As discussed above with respect to element 634 of FIG. 7, the user may specify a search string to be applied to all identified buffers. All buffers which contain the search string value entered by the user in the "SEARCH" window 418 are highlighted on the display screen. Buffers which contain the user's selected search string are highlighted by a visual marker on the display screen next to the buffer. A separate dialog window on the computer display screen shows all the buffers containing the user's search string as well as an offset within the buffer at which the search string was located. As noted above, the user may enter a search string in textual form, binary, or hexidecimal. Standard search techniques including the use of wildcard placeholders in the search string are well known extensions to such search features. Also as noted above, the search string is applied to the identified buffers rather than, necessarily, to sequential states of the captured state logic data. This search feature therefore obviates the need for the engineer to manually search through a sequence of captured states to inspect data values in certain states associated with a particular buffer while ignoring intervening unrelated states, then repeating the same process for other buffers.

Also as shown in FIG. 4, each identified buffer is provided with a unique textual label such as "BUFnn." This textual label is used to associate a display window used to view the data contents of the selected buffer as described above with respect to element 614 of FIG. 6. The user may select a particular buffer by any of several well known user interface techniques and instruct the methods of the present invention to display the data content thereof in a new window. As discussed above, the user may request the display of the buffer's data either in textual form (e.g., hexidecimal dump mode, ASCII or EBCDIC). The unique textual label applied to each identified buffer on the display of FIG. 4 is then used to label the new window used to display the buffer's data content.

FIG. 5 shows an exemplary screen display having two new windows, 500 and 502, showing the data content of selected buffers. Window 502 displays the raw hexidecimal dumps of the data content of buffer labeled "BUF35" on FIG. 4. The title bar portion of the new windows reflects the unique label applied to the corresponding buffer on the underlying table displayed (as in FIG. 4). Window 500 displays the content of a packet in a protocol specific format. As shown in FIG. 5 a Token Ring LAN protocol is displayed. One of ordinary skin in the art will readily recognize the applicability of the methods of the present invention to any of several protocol standards in which an intelligent I/O interface card is used in conjunction with the CPU through a shared memory scheme. LAN protocols are merely exemplary of one such application of the methods of the present invention.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A computer operable method for displaying state logic data acquired by a logic analyzer regarding memory accesses on an electronic interconnect bus connected to said logic analyzer, said method comprising the steps of:

correlating a plurality of data structures with said memory accesses in said state logic data acquired by said logic analyzer; and displaying said plurality of data structures in bands on a computer display screen.

2. The method of claim 1 wherein each of said memory accesses includes an address value and wherein the correlating step comprises:

identifying contiguous ones of said memory accesses in said state logic data wherein ones of said memory accesses are contiguous when their respective address values are in a predetermined sequence.

3. The method of claim 2 wherein each datum of said state logic data possesses a read/write attribute value and wherein the correlating step further comprises:

identifying contiguous ones of said memory accesses in said state logic data having an identical read/write attribute value.

4. The method of claim 3 wherein the displaying step further comprises:

displaying ones of said plurality of data structures having a read/write attribute value indicative of a read operation in a manner distinguishable from the display of ones of said plurality of data structures having a read/write attribute value indicative of a write operation.

5. The method of claim 3 wherein the displaying step further comprises:

displaying ones of said plurality of data structures having a read/write attribute value indicative of a read operation using a first display color on said computer display screen; and displaying ones of said plurality of data structures having a read/write attribute value indicative of a write operation using a second display color on said computer display screen.

6. The method of claim 1 wherein the correlating step comprises:

identifying buffers in said memory accesses in said state logic data as a number of contiguous ones of said memory accesses in said state logic data; and identifying buffer descriptors in said memory accesses in said state logic data as a number of said memory accesses in said state logic data including a pointer to one of said plurality of data structures.

7. The method of claim 6 wherein the displaying step further comprises:

graphically displaying the identified buffers on said computer display screen; and graphically displaying the identified buffer descriptors on said computer display screen in a manner distinguishable from the display of the identified buffers.

8. The method of claim 7 wherein the displaying step further comprises:

determining which one of the identified buffers is referenced by each of the identified buffer descriptors; and displaying indicia of a reference by said each of the identified buffer descriptors to a corresponding said one of the identified buffers.

9. The method of claim 7 further comprising the step of:

detecting probable data corruption errors in the time dispersion characteristics of references to identified buffers and identified buffer descriptors.

10. The method of claim 9 wherein the displaying step further comprises the step of:

displaying identified buffers and identified buffer descriptors corresponding to the detected probable data corruption errors in a manner distinguishable from others of said identified buffers and others of said identified buffer descriptors.

11. The method of claim 1 further comprising the step of:

textually displaying data contained in at least one selected data structure of said plurality of data structures in response to a user request.

12. The method of claim 1 further comprising the step of:

textually displaying communication protocol data contained in at least one selected data structure of said plurality of data structures in response to a user request.

13. The method of claim 1 further comprising the step of:

searching data contained in said plurality of data structures for a specified data sequence in response to a user request.

14. A computer operable method for displaying state logic data acquired by a logic analyzer regarding memory accesses on an electronic interconnect bus connected to said logic analyzer, said method comprising the steps of:

correlating at least one buffer with said state logic data acquired by said logic analyzer wherein said at least one buffer comprises states dispersed in said state logic data representing a sequence of memory accesses to contiguous memory addresses; and displaying said at least one buffer on a computer display screen.

15. The method of claim 14 wherein each datum of said state logic data possesses a read/write attribute value and wherein the correlating step further comprises:

identifying contiguous ones of said memory accesses in said state logic data having an identical read/write attribute value.

16. The method of claim 15 wherein the displaying step further comprises:

displaying said at least one buffer having a read/write attribute value indicative of a read operation in a manner distinguishable from the display of said at least one buffer having a read/write attribute value indicative of a write operation.

17. The method of claim 15 wherein the displaying step further comprises:

displaying said at least one buffer having a read/write attribute value indicative of a read operation using a first display color on said computer display screen; and displaying said at least one buffer having a read/write attribute value indicative of a write operation using a second display color on said computer display screen.

18. The method of claim 14 wherein the correlating step comprises:

identifying said least one buffer in said memory accesses in said state logic data as a number of contiguous ones of said memory accesses in said state logic; and identifying at least one buffer descriptor in said memory accesses in said state logic data as a number of contiguous ones of said memory accesses in said state logic data including a pointer to one of said at least one buffer.

19. The method of claim 18 wherein the displaying step further comprises:

graphically displaying said at least one buffer on said computer display screen; and graphically displaying said at least one buffer descriptor on said computer display screen in a manner distinguishable from the display of the identified buffers.

20. The method of claim 19 wherein the displaying step further comprises:

determining which one of said at least one buffer is referenced by each of said at least one buffer descriptor; and displaying indicia of a reference by said each of said at least one buffer descriptor to a corresponding one of said at least one buffer.

21. The method of claim 18 further comprising the step of:

detecting probable data corruption errors in the time dispersion characteristics of references to said at least one buffer and said at least one buffer descriptor.

22. The method of claim 21 wherein the displaying step further comprises the step of:

displaying said at least one buffer and said at least one buffer descriptor corresponding to the detected probable data corruption errors in a manner distinguishable from others of said at least one buffer and others of said at least one buffer descriptor.

23. The method of claim 14 further comprising the step of:

textually displaying data contained in a selected one of said at least one buffer in response to a user request.

24. The method of claim 14 further comprising the step of:

textually displaying communication protocol data contained at least one selected one of said at least one buffer in response to a user request.

25. The method of claim 14 further comprising the step of:

searching data contained in at least one selected one of said at least one buffer for a specified data sequence in response to a user request.

26. A program storage device readable by a computer, tangibly embodying a program or instructions executable by the computer to perform the method steps for displaying state logic data acquired by a logic analyzer regarding memory accesses on an electronic interconnect bus connected to said logic analyzer, said method steps comprising:

correlating a plurality of data structures with said memory accesses in said state logic data acquired by said logic analyzer; and displaying said plurality of data structures in bands on a computer display screen.

27. The program storage device of claim 26 wherein the correlating method step comprises:

identifying buffers in said memory accesses in said state logic data as a number of contiguous ones of said memory accesses in said state logic data; and identifying buffer descriptors in said memory accesses in said state logic data as a number of said memory accesses in said state logic data including a pointer to one of said plurality of data structures.

28. The program storage device of claim 27 wherein the displaying method step further comprises:

graphically displaying the identified buffers on said computer display screen; and graphically displaying the identified buffer descriptors on said computer display screen in a manner distinguishable from the display of the identified buffers.

29. The program storage device of claim 28 wherein the displaying method step further comprises:

determining which one of the identified buffers is referenced by each of the identified buffer descriptors; and displaying indicia of a reference by said each of the identified buffer descriptors to a corresponding said one of the identified buffers.

30. The program storage device of claim 29 wherein the method steps further comprise the step of:

detecting probable data corruption errors in the time dispersion characteristics of references to identified buffers and identified buffer descriptors.

31. The program storage device of claim 30 wherein the displaying method step further comprises the step of:

displaying identified buffers and identified buffer descriptors corresponding to the detected probable data corruption errors in a manner distinguishable from others of said identified buffers and others of said identified buffer descriptors.

* * * * *